United States Patent
Rico Alvarino et al.

(10) Patent No.: US 11,711,321 B2
(45) Date of Patent: Jul. 25, 2023

(54) COMBINING WITH VARIABLE LIMITED BUFFER RATE MATCHING

(71) Applicant: QUALCOMM Incorporated, San Diego, CA (US)

(72) Inventors: Alberto Rico Alvarino, San Diego, CA (US); Peter Gaal, San Diego, CA (US); Le Liu, Fremont, CA (US); Kazuki Takeda, Tokyo (JP); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/246,298

(22) Filed: Apr. 30, 2021

(65) Prior Publication Data

US 2022/0353203 A1 Nov. 3, 2022

(51) Int. Cl.
| | | |
|---|---|---|
| *H04L 12/861* | (2013.01) | |
| *H04W 88/02* | (2009.01) | |
| *H04L 49/90* | (2022.01) | |
| *H04L 49/201* | (2022.01) | |

(52) U.S. Cl.
CPC ............ *H04L 49/90* (2013.01); *H04L 49/201* (2013.01); *H04W 88/02* (2013.01)

(58) Field of Classification Search
CPC ......... H04L 47/15; H04L 47/30; H04L 47/38; H04L 47/806; H04L 49/201; H04L 49/90; H04W 88/02
See application file for complete search history.

(56) References Cited

U.S. PATENT DOCUMENTS

| | | | |
|---|---|---|---|
| 9,654,584 B2 * | 5/2017 | Han | H04L 1/0013 |
| 9,860,888 B2 * | 1/2018 | Gaal | H04W 72/042 |
| 9,918,184 B2 * | 3/2018 | Han | H04L 67/12 |
| 2019/0013901 A1 * | 1/2019 | Nimbalker | H04L 1/0067 |
| 2020/0153546 A1 * | 5/2020 | Nimbalker | H04L 1/0058 |
| 2020/0266928 A1 * | 8/2020 | Yeo | H04L 5/0092 |
| 2021/0029513 A1 | 1/2021 | Rico Alvarino et al. | |
| 2021/0050956 A1 * | 2/2021 | Yeo | H04L 41/0803 |
| 2022/0104232 A1 * | 3/2022 | Nimbalker | H04L 27/26025 |
| 2022/0278768 A1 * | 9/2022 | Yeo | H04L 1/0023 |

OTHER PUBLICATIONS

International Search Report and Written Opinion—PCT/US2022/071405—ISA/EPO—dated Aug. 26, 2022.

(Continued)

*Primary Examiner* — Alpus Hsu
(74) *Attorney, Agent, or Firm* — Holland & Hart LLP

(57) ABSTRACT

Methods, systems, and devices for wireless communications are described. A user equipment (UE) may receive a first transmission including encoded bits of a data packet and a second transmission including some or all of the encoded bits of the data packet. The first transmission associated with a first limited buffer rate matching (LBRM) configuration and the second transmission may be associated with a second LBRM configuration. The UE may process the first transmission and the second transmission based on the first LBRM associated with the first transmission being different than the second LBRM associated with the second transmission.

36 Claims, 18 Drawing Sheets

(56) References Cited

OTHER PUBLICATIONS

Mediatek Inc: "HARQ Operation to Improve Reliability for PTM Transmission", 3GPP TSG-RAN WG2 Meeting #113 electronic, 3GPP Draft, R2-2100172, 3rd Generation Partnership Project (3GPP), Mobile Competence Centre, 650, Route Des Lucioles, F-06921 Sophia-Antipolis Cedex, France, vol. RAN WG2, No. Electronic, Jan. 25, 2021-Feb. 5, 2021, 4 Pages, Jan. 15, 2021 (Jan. 15, 2021), XP051973385, Retrieved from the Internet: URL: https://ftp.3qpp.org/tsg_ran/WG2_RL2/TSGR2_113-e/Docs/R2-2100172.zip R2-2100172 HARQ operation to improve reliability for PTM transmission v1.docx [retrieved on Jan. 15, 2021] p. 2.
Partial International Search Report—PCT/US2022/071405—ISA/EPO—dated Jun. 15, 2022.
Qualcomm Inc: "NR Multicast and Broadcast Radio Bearer Architecture Aspects", 3GPP TSG-RAN WG2 meeting #113e, 3GPP Draft, R2-2100318 (Revision of R2-2009036), 3rd Generation Partnership Project (3GPP), Mobile Competence Centre, 650, Route Des Lucioles, F-06921 Sophia-Antipolis Cedex, France, vol. RAN WG2, No. E-Meeting, Jan. 25, 2021-Feb. 5, 2021, 12 Pages, Jan. 15, 2021 (Jan. 15, 2021), XP051973510, Retrieved from the Internet: URL: https://ftp.3gpp.org/tsg_ran/WG2_RL2/TSGR2_113-e/Docs/R2-2100318.zip R2-2100318_NR Multicast Broadcast Radio Bearer Architecture aspects_v2.doc [retrieved on Jan. 15, 2021] pp. 6-9.

\* cited by examiner

COMBINING WITH VARIABLE LIMITED BUFFER RATE MATCHING

FIELD OF TECHNOLOGY

The following relates to wireless communications, including combining with variable limited buffer rate matching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may receive multiple transmissions of a data packet. Techniques for processing multiple transmissions of a data packet may be desired.

SUMMARY

The described techniques relate to improved methods, systems, devices, and apparatuses that support combining with variable limited buffer rate matching. A user equipment (UE) may receive an initial transmission for a data packet and a retransmission for the data packet. The initial transmission may be associated with a first limited buffer rate matching (LBRM) configuration and the retransmission may be associated with a second LBRM configuration. The UE may process the transmissions based on the first LBRM configuration being different than the second LBRM configuration.

A method for wireless communication at a UE is described. The method may include receiving control signaling identifying a first limited buffer rate matching configuration associated with multicast transmissions and a second limited buffer rate matching configuration associated with unicast transmissions, processing, using the first limited buffer rate matching configuration, a multicast message including encoded bits of a data packet, and processing, using the first limited buffer rate matching configuration, a unicast message based on the unicast message including a re-transmission of the encoded bits of the data packet.

An apparatus for wireless communication at a UE is described. The apparatus may include a processor, memory coupled with the processor, and instructions stored in the memory. The instructions may be executable by the processor to cause the apparatus to receive control signaling identifying a first limited buffer rate matching configuration associated with multicast transmissions and a second limited buffer rate matching configuration associated with unicast transmissions, process, using the first limited buffer rate matching configuration, a multicast message including encoded bits of a data packet, and process, using the first limited buffer rate matching configuration, a unicast message based on the unicast message including a re-transmission of the encoded bits of the data packet.

Another apparatus for wireless communication at a UE is described. The apparatus may include means for receiving control signaling identifying a first limited buffer rate matching configuration associated with multicast transmissions and a second limited buffer rate matching configuration associated with unicast transmissions, means for processing, using the first limited buffer rate matching configuration, a multicast message including encoded bits of a data packet, and means for processing, using the first limited buffer rate matching configuration, a unicast message based on the unicast message including a re-transmission of the encoded bits of the data packet.

A non-transitory computer-readable medium storing code for wireless communication at a UE is described. The code may include instructions executable by a processor to receive control signaling identifying a first limited buffer rate matching configuration associated with multicast transmissions and a second limited buffer rate matching configuration associated with unicast transmissions, process, using the first limited buffer rate matching configuration, a multicast message including encoded bits of a data packet, and process, using the first limited buffer rate matching configuration, a unicast message based on the unicast message including a re-transmission of the encoded bits of the data packet.

Some examples of the method, apparatuses, and non-transitory computer-readable medium described herein may further include operations, features, means, or instructions for receiving, for the multicast message, first downlink control information that indicates a group identifier for the multicast message, where the multicast message may be processed using the first limited buffer rate matching configuration based on the group identifier being associated with the first limited buffer rate matching configuration and receiving, for the unicast message, second downlink control information that indicates a cell identifier for the unicast message, where the multicast message may be processed using the first limited buffer rate matching configuration based on the cell identifier being associated with the group identifier.

In some examples of the method, apparatuses, and non-transitory computer-readable medium described herein, the multicast message may be associated with a group identifier and the unicast message may be associated with a cell identifier and the method, apparatuses, and non-transitory computer-readable medium may include further operations, features, means, or instructions for receiving, for the unicast message, downlink control information that indicates the unicast message may be associated with the group identifier, where the unicast message may be processed using the first limited buffer rate matching configuration based on the downlink control information indicating that the unicast message may be associated with the group identifier.

In some examples of the method, apparatuses, and non-transitory computer-readable medium described herein, the first limited buffer rate matching configuration indicates a threshold quantity of encoded bits permitted to be input into a circular buffer at a base station.

A method for wireless communication at a UE is described. The method may include receiving a first transmission including encoded bits of a data packet, the first transmission associated with a first limited buffer rate matching configuration, receiving a second transmission including some or all of the encoded bits of the data packet, the second transmission associated with a second limited buffer rate matching configuration that is different from the first limited buffer rate matching configuration, identifying a combining scheme for the first and second transmissions based on the second limited buffer rate matching configuration being different than the first limited buffer rate matching configuration, and processing the second transmission in accordance with the combining scheme.

An apparatus for wireless communication at a UE is described. The apparatus may include a processor, memory coupled with the processor, and instructions stored in the memory. The instructions may be executable by the processor to cause the apparatus to receive a first transmission including encoded bits of a data packet, the first transmission associated with a first limited buffer rate matching configuration, receive a second transmission including some or all of the encoded bits of the data packet, the second transmission associated with a second limited buffer rate matching configuration that is different from the first limited buffer rate matching configuration, identify a combining scheme for the first and second transmissions based on the second limited buffer rate matching configuration being different than the first limited buffer rate matching configuration, and process the second transmission in accordance with the combining scheme.

Another apparatus for wireless communication at a UE is described. The apparatus may include means for receiving a first transmission including encoded bits of a data packet, the first transmission associated with a first limited buffer rate matching configuration, means for receiving a second transmission including some or all of the encoded bits of the data packet, the second transmission associated with a second limited buffer rate matching configuration that is different from the first limited buffer rate matching configuration, means for identifying a combining scheme for the first and second transmissions based on the second limited buffer rate matching configuration being different than the first limited buffer rate matching configuration, and means for processing the second transmission in accordance with the combining scheme.

A non-transitory computer-readable medium storing code for wireless communication at a UE is described. The code may include instructions executable by a processor to receive a first transmission including encoded bits of a data packet, the first transmission associated with a first limited buffer rate matching configuration, receive a second transmission including some or all of the encoded bits of the data packet, the second transmission associated with a second limited buffer rate matching configuration that is different from the first limited buffer rate matching configuration, identify a combining scheme for the first and second transmissions based on the second limited buffer rate matching configuration being different than the first limited buffer rate matching configuration, and process the second transmission in accordance with the combining scheme.

In some examples of the method, apparatuses, and non-transitory computer-readable medium described herein, the first transmission includes a multicast transmission and the second transmission includes a unicast transmission.

In some examples of the method, apparatuses, and non-transitory computer-readable medium described herein, the first transmission includes a unicast transmission and the second transmission includes a multicast transmission.

Some examples of the method, apparatuses, and non-transitory computer-readable medium described herein may further include operations, features, means, or instructions for determining a first set of log-likelihood ratios (LLRs) based on the first transmission, the first set of LLRs including a first quantity of LLRs and determining a second set of LLRs based on the second transmission, the second set of LLRs including a second quantity of LLRs different than the first quantity.

In some examples of the method, apparatuses, and non-transitory computer-readable medium described herein, the first set of LLRs may be determined based on the first limited buffer rate matching configuration and the second set of LLRs may be determined based on the second limited buffer rate matching configuration.

In some examples of the method, apparatuses, and non-transitory computer-readable medium described herein, processing the second transmission may include operations, features, means, or instructions for combining the first set of LLRs with the second set of LLRs to generate a combined set of LLRs, the combining based on a difference between the first quantity and the second quantity and attempting to decode the combined set of LLRs based on a size difference between the first quantity and the second quantity.

Some examples of the method, apparatuses, and non-transitory computer-readable medium described herein may further include operations, features, means, or instructions for storing the combined set of LLRs in memory based on a failure of the attempt to decode the combined set of LLRs, the combined set of LLRs based on a size difference between the first quantity and the second quantity.

In some examples of the method, apparatuses, and non-transitory computer-readable medium described herein, processing the second transmission may include operations, features, means, or instructions for combining the first set of LLRs with a subset of the second set of LLRs to generate a combined set of LLRs, the subset of the second set of LLRs including the first quantity and attempting to decode the combined set of LLRs, the combined set of LLRs including the first quantity.

Some examples of the method, apparatuses, and non-transitory computer-readable medium described herein may further include operations, features, means, or instructions for storing the combined set of LLRs in memory based on a failure of the attempt to decode the combined set of LLRs.

In some examples of the method, apparatuses, and non-transitory computer-readable medium described herein, processing the second transmission may include operations, features, means, or instructions for attempting to decode the second set of LLRs independent of the first set of LLRs.

Some examples of the method, apparatuses, and non-transitory computer-readable medium described herein may further include operations, features, means, or instructions for storing the second set of LLRs in memory, and discarding the first set of LLRs, based on a failure of the attempt to decode the second set of LLRs.

In some examples of the method, apparatuses, and non-transitory computer-readable medium described herein, the first set of LLRs may be associated with a first set of encoded bits that includes the encoded bits and the second set of LLRs may be associated with a second set of encoded bits that includes the encoded bits and the method, apparatuses, and non-transitory computer-readable medium may include further operations, features, means, or instructions for determining whether the second set of encoded bits corresponds to encoded bits in the first set of encoded bits that were consecutively stored in a circular buffer at a base station, where the combining scheme may be identified based on the determination.

Some examples of the method, apparatuses, and non-transitory computer-readable medium described herein may further include operations, features, means, or instructions for combining a subset of the second set of LLRs with the first set of LLRs to generate a combined set of LLRs, the combining based on the second set of encoded bits corresponding to encoded bits in the first set of encoded bits that were nonconsecutively stored in the circular buffer and attempting to decode the combined set of LLRs.

Some examples of the method, apparatuses, and non-transitory computer-readable medium described herein may further include operations, features, means, or instructions for receiving an indication that the first limited buffer rate matching configuration may be associated with transmissions of a first type, where the first transmission may be of the first type and receiving an indication that the second limited buffer rate matching configuration may be associated with transmissions of a second type, where the second transmission may be of the second type.

Some examples of the method, apparatuses, and non-transitory computer-readable medium described herein may further include operations, features, means, or instructions for indicating a capability of the UE to combine transmissions associated with different limited buffer rate matching configurations, where the combining scheme may be based on the capability of the UE.

Some examples of the method, apparatuses, and non-transitory computer-readable medium described herein may further include operations, features, means, or instructions for indicating a capability of the UE to support different limited buffer rate matching configurations for different transmission types, where the combining scheme may be based on the capability of the UE.

Some examples of the method, apparatuses, and non-transitory computer-readable medium described herein may further include operations, features, means, or instructions for indicating, to a base station, a quantity of limited buffer rate matching configurations the UE may be capable of supporting for a component carrier.

A method for wireless communication at a UE is described. The method may include receiving a first transmission including encoded bits of a data packet, the first transmission associated with a first limited buffer rate matching configuration, receiving a second transmission including some or all of the encoded bits of the data packet, the second transmission associated with a second limited buffer rate matching configuration that is different from the first limited buffer rate matching configuration, comparing, based on the second limited buffer rate matching configuration being different from the first limited buffer rate matching configuration, a first buffer size associated with the first transmission and a second buffer size associated with the second transmission, and processing the second transmission based on the comparison of the first buffer size and the second buffer size.

An apparatus for wireless communication at a UE is described. The apparatus may include a processor, memory coupled with the processor, and instructions stored in the memory. The instructions may be executable by the processor to cause the apparatus to receive a first transmission including encoded bits of a data packet, the first transmission associated with a first limited buffer rate matching configuration, receive a second transmission including some or all of the encoded bits of the data packet, the second transmission associated with a second limited buffer rate matching configuration that is different from the first limited buffer rate matching configuration, comparing, base at least in part on the second limited buffer rate matching configuration being different from the first limited buffer rate matching configuration, a first buffer size associated with the first transmission and a second buffer size associated with the second transmission, and process the second transmission based on the comparison of the first buffer size and the second buffer size.

Another apparatus for wireless communication at a UE is described. The apparatus may include means for receiving a first transmission including encoded bits of a data packet, the first transmission associated with a first limited buffer rate matching configuration, means for receiving a second transmission including some or all of the encoded bits of the data packet, the second transmission associated with a second limited buffer rate matching configuration that is different from the first limited buffer rate matching configuration, means for comparing, based on the second limited buffer rate matching configuration being different from the first limited buffer rate matching configuration, a first buffer size associated with the first transmission and a second buffer size associated with the second transmission, and means for processing the second transmission based on the comparison of the first buffer size and the second buffer size.

A non-transitory computer-readable medium storing code for wireless communication at a UE is described. The code may include instructions executable by a processor to receive a first transmission including encoded bits of a data packet, the first transmission associated with a first limited buffer rate matching configuration, receive a second transmission including some or all of the encoded bits of the data packet, the second transmission associated with a second limited buffer rate matching configuration that is different from the first limited buffer rate matching configuration, comparing, base at least in part on the second limited buffer rate matching configuration being different from the first limited buffer rate matching configuration, a first buffer size associated with the first transmission and a second buffer size associated with the second transmission, and process the second transmission based on the comparison of the first buffer size and the second buffer size.

Some examples of the method, apparatuses, and non-transitory computer-readable medium described herein may further include operations, features, means, or instructions for determining, based on the comparison, that the second buffer size may be different than the first buffer size, where processing the second transmission includes identifying the second transmission as an error.

Some examples of the method, apparatuses, and non-transitory computer-readable medium described herein may further include operations, features, means, or instructions for determining, based on the comparison, that the second buffer size may be equal to the first buffer size, where processing the second transmission includes combining the second transmission with the first transmission based on the determination.

Some examples of the method, apparatuses, and non-transitory computer-readable medium described herein may further include operations, features, means, or instructions for determining, based on the comparison, that the second buffer size may be smaller than the first buffer size, where processing the second transmission includes identifying the second transmission as an error.

Some examples of the method, apparatuses, and non-transitory computer-readable medium described herein may further include operations, features, means, or instructions for determining, based on the comparison, that the second buffer size may be larger than the first buffer size, where processing the second transmission includes combining the second transmission with the first transmission based on the determination.

Some examples of the method, apparatuses, and non-transitory computer-readable medium described herein may further include operations, features, means, or instructions for determining the first buffer size based on a first quantity of encoded bits associated with a transport block size for the first transmission and a second quantity of encoded bits associated with a circular buffer at a base station and determining the second buffer size based on a third quantity of encoded bits associated with a transport block size for the second transmission and a fourth quantity of encoded bits associated with the circular buffer at the base station.

A method for wireless communication at a base station is described. The method may include transmitting control signaling identifying a first limited buffer rate matching configuration associated with multicast transmissions and a second a second limited buffer rate matching configuration associated with unicast transmissions, using the first limited buffer rate matching configuration for a multicast message including encoded bits of a data packet, and using the first limited buffer rate matching configuration for a unicast message based on the unicast message including a re-transmission of the encoded bits or the data packet.

An apparatus for wireless communication at a base station is described. The apparatus may include a processor, memory coupled with the processor, and instructions stored in the memory. The instructions may be executable by the processor to cause the apparatus to transmit control signaling identifying a first limited buffer rate matching configuration associated with multicast transmissions and a second a second limited buffer rate matching configuration associated with unicast transmissions, used the first limited buffer rate matching configuration for a multicast message including encoded bits of a data packet, and used the first limited buffer rate matching configuration for a unicast message based on the unicast message including a re-transmission of the encoded bits or the data packet.

Another apparatus for wireless communication at a base station is described. The apparatus may include means for transmitting control signaling identifying a first limited buffer rate matching configuration associated with multicast transmissions and a second a second limited buffer rate matching configuration associated with unicast transmissions, means for using the first limited buffer rate matching configuration for a multicast message including encoded bits of a data packet, and means for using the first limited buffer rate matching configuration for a unicast message based on the unicast message including a re-transmission of the encoded bits or the data packet.

A non-transitory computer-readable medium storing code for wireless communication at a base station is described. The code may include instructions executable by a processor to transmit control signaling identifying a first limited buffer rate matching configuration associated with multicast transmissions and a second a second limited buffer rate matching configuration associated with unicast transmissions, used the first limited buffer rate matching configuration for a multicast message including encoded bits of a data packet, and used the first limited buffer rate matching configuration for a unicast message based on the unicast message including a re-transmission of the encoded bits or the data packet.

Some examples of the method, apparatuses, and non-transitory computer-readable medium described herein may further include operations, features, means, or instructions for transmitting, for the multicast message, first downlink control information that indicates a group identifier for the multicast message, the group identifier associated with the first limited buffer rate matching configuration and transmitting, for the unicast message, second downlink control information that indicates a cell identifier for the unicast message, where the multicast message may be processed using the first limited buffer rate matching configuration based on the cell identifier being associated with the group identifier.

In some examples of the method, apparatuses, and non-transitory computer-readable medium described herein, the multicast message may be associated with a group identifier and the unicast message may be associated with a cell identifier and the method, apparatuses, and non-transitory computer-readable medium may include further operations, features, means, or instructions for transmitting, for the unicast message, downlink control information that indicates the unicast message may be associated with the group identifier.

DETAILED DESCRIPTION

In some wireless communications systems, a user equipment (UE) may combine transmissions of data bits for a data packet (e.g., a code block) to increase the likelihood that the UE is able to decode the data packet. For example, the UE may determine respective logarithmic-likelihood-ratios (LLRs) for each transmission of data bits for the data packet and combine the LLRs from different transmissions to improve the decodability of the data packet. The UE may combine the LLRs based on a rate matching (e.g., a limited buffer rate matching (LBRM)) configuration used for the transmissions. But in some cases, different transmissions of data bits for a data packet may be associated with different LBRM configurations (e.g., the LBRM configurations may vary between the transmissions). For example, a multicast transmission for the data packet may be associated with a first LBRM configuration and a unicast retransmission for the data packet may be associated with a second LBRM configuration. A UE that receives transmissions of data bits for a data packet that are associated with different LBRM configurations may be unable to properly process the transmissions using existing techniques.

According to the techniques described herein, a UE may properly process transmissions for a data packet that are associated with different LBRM configurations. In a first technique (Technique 1), a UE that receives a multicast transmission for a data packet may use the LBRM configuration associated with multicast transmissions for all retransmissions for the data packet, even if the retransmissions are unicast transmissions. In a second technique (Technique 2), a UE that receives multiple transmissions for a data packet that are associated with different LBRM configurations may process the transmissions based on the different LBRM configurations. In a third technique (Technique 3), a UE that receives multiple transmissions for a data packet that are associated with different LBRM configurations may process the transmissions based on the respective buffer sizes associated with the transmissions.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to combining with variable limited buffer rate matching.

Figure 1:
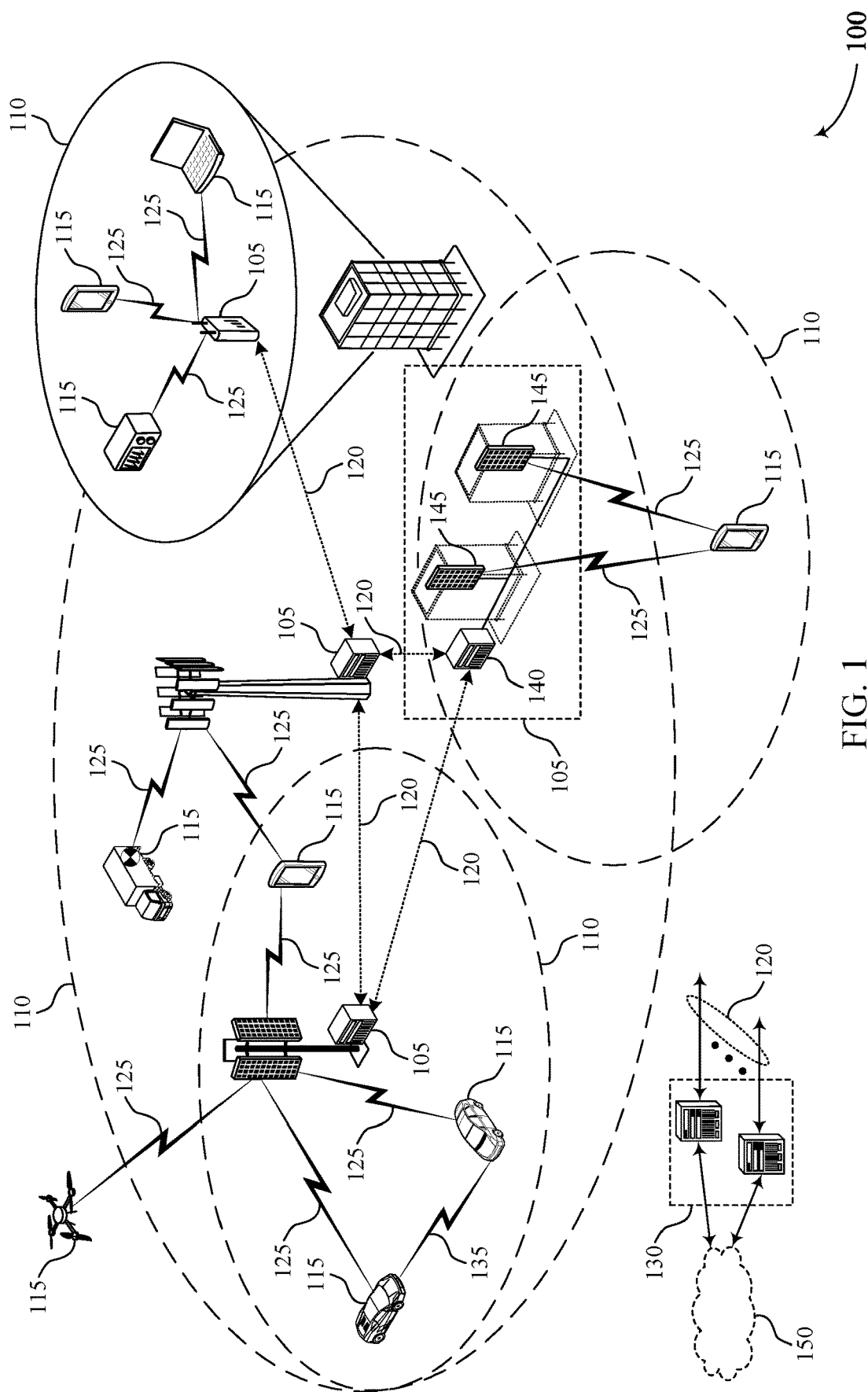
FIG. 1 illustrates an example of a wireless communications system that supports combining with variable limited buffer rate matching in accordance with aspects of the present disclosure.

FIG. 1 illustrates an example of a wireless communications system 100 that supports combining with variable limited buffer rate matching in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive multiple transmissions for a data packet (e.g., a codeword). For example, the UE 115 may receive a retransmission for a data packet in response to a negative acknowledgement (NACK) for an initial transmission for the data packet that the UE 115 was unable to decode. The UE 115 may determine a set of LLRs for the initial transmission and store the LLRs in memory for combination with a set of LLRs determined from the retransmission. An LLR may represent the ratio of the probabilities of two different hypotheses for an encoded data bit. So, an LLR may provide information about the most likely value of an encoded data bit and the reliability of that estimate. A UE 115 may compute an LLR for each encoded data bit in a transmission, where each hypothesis corresponds to one possible value of the encoded data bit.

A UE 115 that determines LLRs for different transmissions for a data packet may combine the LLRs from the transmissions to improve the likelihood that the UE can decode the data packet. Such a technique may be referred to as HARQ combining. In some examples, the UE may determine and combine the LLRs from different transmissions based on the respective LBRM configuration for the transmissions. But sometimes different transmissions for a data packet may be associated with different LBRM configurations. A UE 115 may implement the techniques described herein to properly process such transmissions. For example, the UE 115 may implement aspects of Technique 1, Technique 2, and/or Technique 3, as described herein.

In Technique 1, the UE 115 may apply the multicast LBRM configuration to any retransmission of a multicast data packet, regardless of the type of re-transmission. In Technique 2, the UE 115 may combine the LLRs from multiple transmissions of a data packet based on the difference between LBRM configurations for the transmissions. In Technique 3, the UE 115 may process a retransmission of a data packet based on the relative buffer sizes for the retransmission and the initial transmission. Although described separately, aspects of Technique 1, Technique 2, and/or Technique 3 may be combined, and such combinations fall within the scope of this disclosure.

An LBRM configuration may also be referred to as an LBRM assumption, an LBRM scheme, or other suitable terminology.

Figure 2:
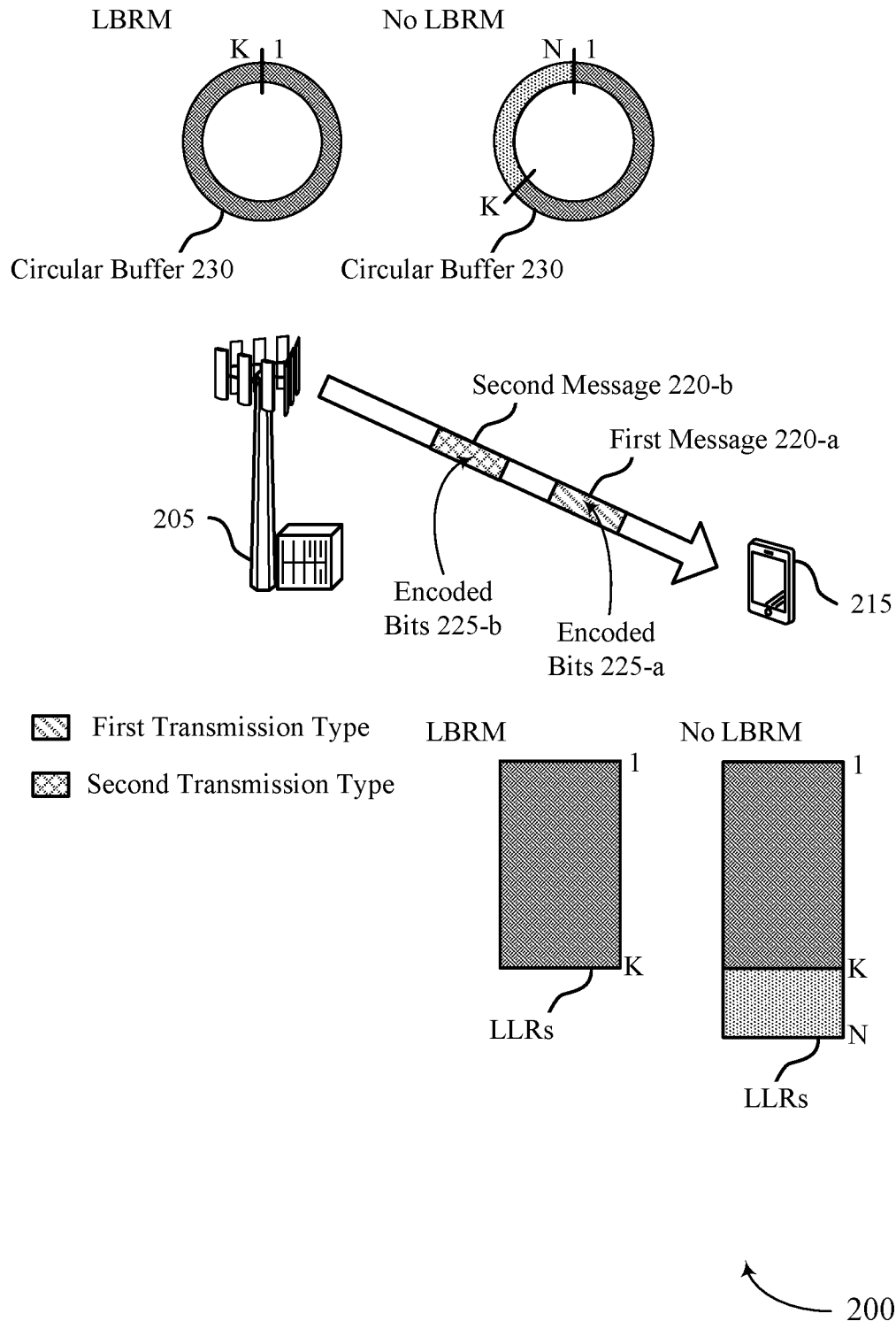
FIG. 2 illustrates an example of a wireless communications system that supports combining with variable limited buffer rate matching in accordance with aspects of the present disclosure.

FIG. 2 illustrates an example of a wireless communications system 200 that supports combining with variable limited buffer rate matching in accordance with aspects of the present disclosure. The wireless communications system 200 may include a base station 205 and a UE 215, which may be examples of a base station 105 and a UE 115, respectively, as described with reference to FIG. 1. The base station 205 and the UE 215 may implement aspects of the techniques described herein so that the UE 215 may properly process transmissions for a data packet that are associated with different LBRM configurations.

The base station 205 may include a circular buffer 230 that the base station 205 uses for transmissions of data. Instead of moving data through the circular buffer 230 to implement a first-in-first-out (FIFO) structure, which may be the case for other types of buffers, the base station 205 may operate the circular buffer 230 as a FIFO structure by managing pointers that change the starting and ending positions of the circular buffer 230.

When the base station 205 has data for the UE 215, the base station 205 may encode the data (e.g., using a low-density parity-check (LDPC) code with a mother code rate) and input some or all of the encoded data into the circular buffer 230. For example, if the base station 205 has 1000 bits of data for the UE 215 and is using a mother code rate of $\frac{1}{3}$, the base station 205 may encode the 1000 bits of data into 3000 encoded bits that represent a data packet (e.g., a code block). Encoding data may increase the reliability of the data. The quantity of encoded bits output by the encoder may be denoted as N and may be based on the transport block size, among other parameters.

The quantity of encoded bits input into the circular buffer (denoted $N_{ref}$) may depend on the LBRM configuration used by the base station 205.

If the base station 205 is not using LBRM, the base station 205 may input all encoded bits for the data packet into the circular buffer 230. For example, given N encoded bits from the LDPC encoding, the base station 205 may input N encoded bits into the circular buffer 230 (e.g., $N_{ref}$ may be equal to N). The base station 205 may transmit the N encoded bits in the circular buffer 230 in order, starting at bit 1 and progressing around the circular buffer 230 in a sequential manner. If the resources (e.g., a transport block) allocated for transmission of the codeword are able to carry more than N bits, the base station 205 may wrap around the circular buffer until the resources are saturated (e.g., until the quantity of encoded bits for transmission matches the capacity of the transport block). As an example, given a transport block capacity of 6000 bits and $N_{ref}$=N=3000 bits, the base station 205 may wrap around the circular buffer 230 twice.

In some examples, the base station 205 may implement LBRM to reduce the quantity of unique encoded bits in a transmission, which may reduce processing and storage overhead at a receiving UE. If the base station 205 uses LBRM, the base station 205 may input a subset of the encoded bits for the data packet into the circular buffer 230. For example, given N encoded bits from the LDPC encoding, the base station 205 may input K encoded bits into the circular buffer 230, where K is less than N. Thus, $N_{ref}$ may be equal to N for the no LBRM case and may be equal to K for the LBRM case. Further, bits K+1 through N in the no LBRM case may not appear in the circular buffer in the LBRM case. The base station 205 may transmit the K encoded bits in the circular buffer 230 in order, starting at bit 1 and progressing around the circular buffer 230. If the resources (e.g., for a transport block) allocated for transmission of the codeword is able to carry more than K bits, the base station 205 may wrap around the circular buffer until the resources are saturated (e.g., until the quantity of encoded bits for transmission matches the capacity of the transport block). As an example, given a resource allocation capacity of 6000 bits and $N_{ref}$=K=2000 bits, the base station 205 may wrap around the circular buffer 230 three times.

In some examples, the base station 205 may use a starting bit other than bit 1 for a transmission. For example, the base station may use different starting bits for transmissions with different redundancy versions (RVs) for the data packet. Higher redundancy versions may have higher starting bits relative to lower redundancy versions. For example, the starting bit for redundancy version 0 (RV0) may be bit 1 and the starting bits for redundancy version 4 (RV4) may be bit K−10.

As noted, the base station 205 may implement different LBRM configurations for different transmissions. An LBRM configuration may refer to one or more LBRM parameters that impact LBRM operations at the base station 205. For example, an LBRM configuration may include $N_{ref}$, among other parameters.

In some examples, the base station 205 may use different LBRM configurations for different types of transmissions. For example, the base station 205 may implement a first LBRM configuration (e.g., LBRM with $N_{ref}$=K) for multicast transmissions and a second LBRM configuration (e.g., no LBRM, where $N_{ref}$=N) for unicast transmissions. To aid processing at the UE 215, the base station 205 may indicate the LBRM configuration associated with each type of transmission to the UE 215. For example, the base station 205 may indicate that $N_{ref}$=K for multicast transmissions and may indicate that $N_{ref}$=N for unicast transmissions. The LBRM configuration may allow the UE 215 to identify the order of the encoded bits received in a transmission.

In some examples, the base station 205 may transmit encoded bits for a data packet using different types of transmissions that are associated with different LBRMs. For example, the base station 205 may transmit a first message 220-*a* that includes encoded bits 225-*b*. The first message 220-*a* may be included in transmission of a first type. If the UE 215 is unable to decode the encoded bits 325-*b*, the UE 215 may send a NACK indicating as much to the base station 205. Accordingly, the base station 205 may transmit a second message 220-*b* that includes encoded bits 225-*b*. The second message 220-*b* may be included in a transmission of a second type. The first message 220-*a* and the second message 220-*b* may be included in (e.g., conveyed by) respective physical downlink shared channels (PDSCHs) and may be scheduled by respective downlink control information (DCI).

In some examples, the first transmission type may be a multicast transmission and the second transmission type may be a unicast transmission. In such examples, the base station may use LBRM for the first message 220-*a* (e.g., to accommodate the least powerful UE that receives the multicast transmission) and no LBRM for the second message 220-*b*. Thus, the first message 220-*a* may include encoded bits 1 through K (some or all of which may be repeated) and the second message may include encoded bits 1 through N (some or all of which may be repeated). According to the techniques described herein, the UE 215 may determine LLRs for the K encoded bits 220-*a* and, upon failing to decode the K LLRs, store the K LLRs in memory for later use. Upon receipt of the second message 220-*b*, the UE 215 may determine LLRs for the N encoded bits 220-*b* and temporarily store the N LLRs in a buffer (e.g., a demodulation buffer) for combination with some, all, or none of the K LLRs stored in memory. Various combining schemes for Technique 2 are described herein and with reference to FIGS. 4 through 7.

In other examples, the first transmission type may be a unicast transmission and the second transmission type may be a multicast transmission. In such examples, the base station may use LBRM for the second message 220-*b* but not for the first message 220-*a*. Thus, the first message 220-*a* may include encoded bits 1 through N (some or all of which may be repeated) and the second message may include encoded bits 1 through K (some or all of which may be repeated). According to the techniques described herein the UE 215 may determine LLRs for the N encoded bits 220-*a* and, upon failing to decode the N LLRs, store the N LLRs in memory for later use. Upon receipt of the second message 220-*b*, the UE 215 may determine LLRs for the K encoded bits 220-*b* and temporarily store the K LLRs in a buffer (e.g., a demodulation buffer) for combination with some, all, or none of the N LLRs stored in memory. Various combining schemes for Technique 2 are described herein and with reference to FIGS. 4 through 7.

The UE 215 may determine LLRs for a transmission based on the LBRM configuration used for that LBRM transmission. In Technique 1, the UE 215 may use the LBRM configuration associated with multicast transmissions for any retransmission for a data packet, regardless of the type of retransmission. Additional aspects related to Technique 1 are described herein and with reference to FIG. 3.

In some examples, use of different LBRMs for different transmissions for a data packet may not be permitted in certain scenarios. In Technique 3, the UE 215 may classify the second message 220-*b* as an error if a buffer size for the second transmission (e.g., the buffer size for the data packet/code block) is different than the buffer size for the first transmission. The buffer size per code block may be denoted $N_{cb}$ and may also be referred to as a buffer length, a circular buffer length, a buffer dimension, a buffer size per transmission, or other suitable terminology. Additional aspects related to Technique 3 are described herein and with reference to FIG. 8.

Although described with reference to LBRM and no LBRM, the techniques described herein may be implemented for transmissions that have different LBRM powers (e.g., a first LBRM with $N_{ref}=K$ and a second LBRM with $N_{ref}=L$, where L is greater than K). Although described separately, aspects of Technique 1, Technique 2, and/or Technique 3 may be combined, and such combinations fall within the scope of this disclosure.

Figure 3:
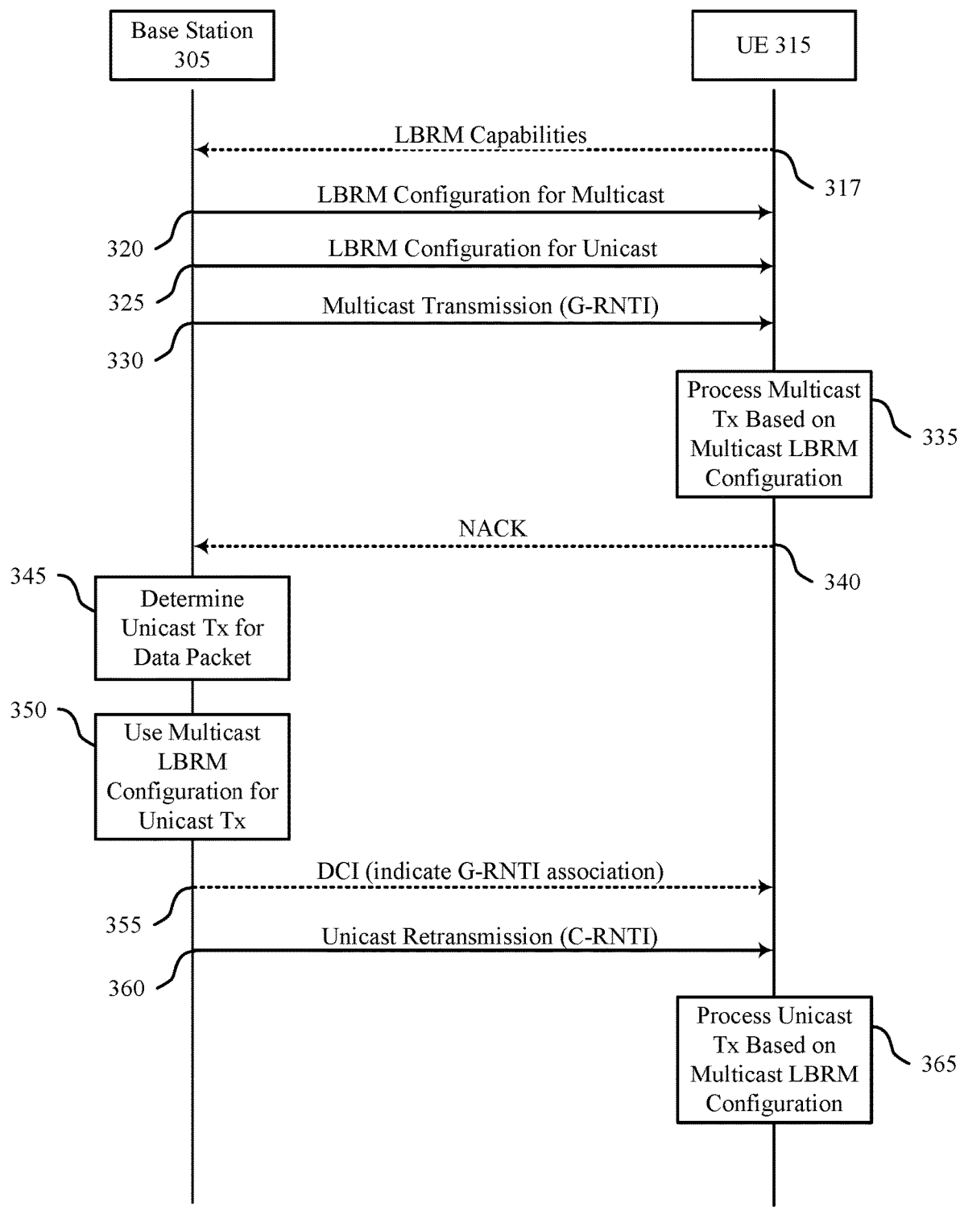
FIG. 3 illustrates an example of a process flow that supports combining with variable limited buffer rate matching in accordance with aspects of the present disclosure.

FIG. 3 illustrates an example of a process flow 300 that supports combining with variable limited buffer rate matching in accordance with aspects of the present disclosure. In some examples, the process flow 300 may be related to aspects of the wireless communications system 100 or the wireless communications system 200. For example, the process flow 300 may be implemented by a base station 305 and a UE 315, which may be examples of a base station and a UE as described herein. Process flow 300 may illustrate operations of the base station 305 and the UE 315 for Technique 1.

At 317, the UE 315 may transmit an indication of one or more LBRM capabilities of the UE. For example, the UE 315 may indicate whether the UE 315 is capable of combining PDSCHs (e.g., multiple transmissions for a data packet) with different LBRM configurations. As another example, the UE 315 may indicate whether the UE 315 is capable of supporting different LBRM configurations for different types of transmissions (e.g., multicast transmissions and unicast transmissions). As another example, the UE 315 may indicate the maximum quantity of LBRM configurations the UE 315 can support in a given component carrier (CC). The UE 315 may indicate the maximum quantity of LBRM configurations if multiple group identifiers (e.g., group radio network temporary identifiers (G-RNTIs)) are configured for the UE 315. In some examples, the LBRM capabilities of the UE 315 may serve as bases for operations or decisions by the base station 305.

At 320, the base station 305 may transmit, and the UE 315 may receive, an indication of a first LBRM configuration associated with a first type of transmission (e.g., multicast transmissions). In some examples, the first LBRM configuration may be an LBRM 'on' configuration with $N_{ref}=K$, where K is less than N (and N is the quantity of encoded packets for a data packet). In some examples, the base station 305 may indicate one or more group identifiers associated with the first LBRM configuration (e.g., because different group identifiers may be associated with different LBRM configurations). At 325, the base station 305 may transmit, and the UE 315 may receive, an indication of a second LBRM configuration associated with a second type of transmission (e.g., unicast transmissions). In some examples, the second LBRM configuration may be an LBRM 'off' configuration (e.g., $N_{ref}$ may be equal to N). The indication of the first LBRM configuration and the indication of the second LBRM configuration may be included in the same message (e.g., a radio resource control (RRC) message) or in different messages.

At 330, the base station 305 may transmit, and the UE 315 may receive, a multicast transmission that includes one or more repetitions of the encoded packets 1 through K. The multicast transmission may be associated with a group identifier (e.g., a G-RNTI). In some examples, the multicast transmission may be preceded by DCI that schedules the multicast transmission and that indicates the group identifier associated with the multicast transmission.

At 335, the UE 315 may process the multicast transmission (Tx) based on the first LBRM configuration associated with multicast transmissions. The UE 315 may select the first LBRM configuration for processing based on the multicast transmission being associated with the G-RNTI. Processing the multicast transmission may include determining LLRs for the encoded bits 1 through K, attempting to decode the K LLRs, and storing the K LLRs in memory if the attempt to decode fails.

At 340, the UE 315 may transmit, and the base station 305 may receive, a NACK. The UE 315 may transmit the NACK based on failing to decode the encoded bits in the multicast transmission.

At 345, the base station 305 may determine to use a unicast transmission for the data packet. The base station 305 may determine to provide a unicast retransmission for the data packet based on the NACK received at 340.

At 350, the base station 305 may use the first LBRM configuration associated with multicast transmissions for the unicast transmission. For example, the base station 305 may input encoded bits 1 through K for the data packet into the circular buffer (rather than encoded bits 1 through N, as called for by the second LBRM configuration associated with unicast transmissions). At 355, the base station 305 may transmit, and the UE 315 may receive, DCI for the unicast transmission. The DCI may schedule the uncast transmission and indicate a unique identifier (e.g., a cell RNTI (C-RNTI)) associated with the unicast transmission. The DCI may also indicate that the unicast transmission is associated with the multicast transmission. For example, the DCI may indicate that the unicast transmission is associated with the G-RNTI of the multicast transmission. Indicating the association between the unicast transmission and the G-RNTI may allow the UE 315 to apply (to the unicast transmission) the LBRM configuration associated with multicast transmissions even if the UE 315 was unable to decode the G-RNTI in the DCI for the multicast transmission.

At 360, the base station 305 may transmit, and the UE 315 may receive, a unicast transmission for the data packet. The unicast transmission may be associated with the C-RNTI indicated by the DCI and may include one or more repetitions of the encoded bits 1 through K for the data packet. At 365, the UE 315 may process the unicast transmission based on the first LBRM configuration associated with multicast transmissions. The UE 315 may select the first LBRM configuration for processing the unicast transmission based on the unicast transmission being a retransmission for the multicast transmission received at 330. Processing the unicast transmission may include determining LLRs for the encoded bits 1 through K, combining the K LLRs from the unicast transmission with the K LLRs from the multicast transmission, attempting to decode the combined LLRs, and storing the combined LLRs in memory if the attempt to decode fails.

Thus, the base station 305 and the UE 315 may use the multicast LBRM configuration for a unicast retransmission for a multicast data packet.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 4:
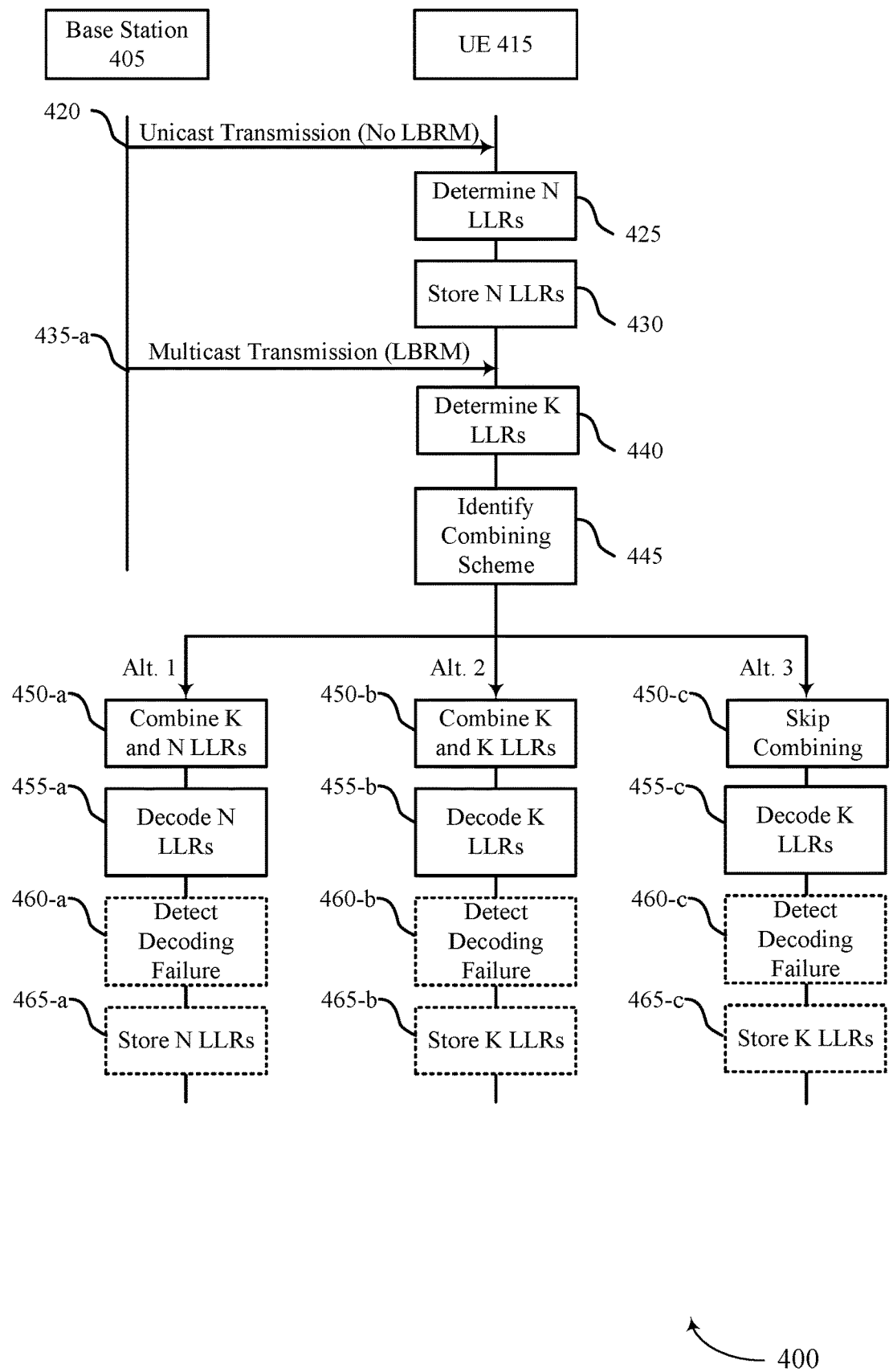
FIG. 4 illustrates an example of a process flow that supports combining with variable limited buffer rate matching in accordance with aspects of the present disclosure.

FIG. 4 illustrates an example of a process flow 400 that supports combining with variable limited buffer rate matching in accordance with aspects of the present disclosure. In some examples, the process flow 400 may be related to aspects of the wireless communications system 100 or the wireless communications system 200. For example, the process flow 400 may be implemented by a base station 405 and a UE 415, which may be examples of a base station and a UE as described herein. The process flow 400 may illustrate operations of the base station 405 and the UE 415 for Technique 2. In the process flow 400, an initial transmission for a data packet encoded to N bits may be a unicast transmission and a retransmission for the data packet may be a multicast transmission.

Prior to 420, the base station 405 may transmit, and the UE 415 may receive, indications of the LBRM configurations associated with different transmission types. For example, the base station 405 may indicate a first LBRM configuration associated with a first transmission type (e.g., unicast transmissions) and a second LBRM configuration associated with a second transmission type (e.g., multicast transmissions). In some examples, the UE 415 may transmit, and the base station 405 may receive, one or more indications of LBRM capabilities of the UE 415.

At 420, the base station 405 may transmit, and the UE 415 may receive, a unicast transmission for a data packet. The unicast transmission may be associated with the first LBRM configuration (e.g., LBRM set to 'off' with $N_{ref}=N$). Thus, the unicast transmission may include N unique encoded bits of the data packet (e.g., encoded bits 1 through N for RV0), some or all of which may be repeated (e.g., depending on N and/or the capacity of the resources scheduled for the unicast transmission). At 425, the UE 415 may determine N LLRs for the unicast transmission (e.g., the UE 415 may determine an LLR for each of the N encoded bits included in the unicast transmission). The UE 415 may determine N LLRs for the unicast transmission based on the first LBRM configuration for the unicast transmission. At 430, the UE 415 may store the N LLRs in memory. The UE 415 may store the N LLRs in memory based on the UE 415 failing to decode the N LLRs.

At 435, the base station 405 may transmit, and the UE 415 may receive, a multicast transmission that is associated with the second LBRM configuration (e.g., LBRM set to 'on' with $N_{ref}=K$, where K is less than N). Thus, the unicast transmission may include K unique encoded bits (e.g., encoded bits 1 through K for RV0), some or all of which may be repeated (e.g., depending on N and/or the capacity of the resources scheduled for the multicast transmission). In some examples, the multicast transmission is in response to a NACK for the unicast transmission.

At 440, the UE 415 may determine K LLRs for the unicast transmission (e.g., the UE 415 may determine an LLR for each of the K encoded bits included in the multicast transmission). The UE 415 may determine the K LLRs for the multicast transmission based on the second LBRM configuration for the multicast transmission. In some examples, the K LLRs may be temporarily stored in a demodulation buffer.

At 445, the UE 415 may identify a combining scheme based on the second LBRM for the multicast transmission being different than the first LBRM configuration for the unicast transmission. At 450, the UE 415 may combine the LLRs in accordance with the combining scheme identified by the UE 415.

In a first alternative (Alt. 1) for the combining scheme, the UE 415 may, at 450-a, combine the K LLRs from the demodulation buffer with the N LLRs from memory. When combining the K LLRs and the N LLRs, the UE 415 may account for the difference in size between the K LLRs and the N LLRs. For example, the UE 415 may combine the LLRs for encoded bits 1 through K from the multicast transmission with the LLRs for encoded bits 1 through K from the unicast transmission. Thus, the UE 415 may generate a new set of N LLRs, K of which may be combined. After combining the LLRs, the UE 415 may continue processing the transmissions based on the combining scheme. For example, at 455-a, the UE 415 may attempt to decode the set of N LLRs. If, at 460-a, the UE 415 detects that the decoding attempt has failed, the UE 415 may, at 465-a, store the set of N LLRs in memory. If the decoding attempt is successful, the UE 415 may process the decoded data packet accordingly.

In a second alternative (Alt. 2) for the combining scheme, the UE 415 may, at 450-b, combine the K LLRs from the demodulation buffer with K of the N LLRs from memory. However, the UE 415 may not use the K+1 though N LLRs from the unicast transmission. Thus, the UE 415 may generate a new set of K combined LLRs. After combining the LLRs, the UE 415 may continue processing the transmissions based on the combining scheme. For example, at 455-b, the UE 415 may attempt to decode the set of K combined LLRs. If, at 460-b, the UE 415 detects that the decoding attempt has failed, the UE 415 may, at 465-b, store the set of K combined LLRs in memory and discard the K+1 through N LLRs. If the decoding attempt is successful, the UE 415 may process the decoded data packet accordingly.

In a third alternative (Alt. 3) for the combining scheme, the UE 415 may skip combining at 450-c and may attempt to decode the set of K LLRs from the multicast transmission at 455-c. If, at 460-c, the UE 415 detects that the decoding attempt has failed, the UE 415 may, at 465-c, store the set of K LLRs in memory and discard the old N LLRs from the unicast transmission. If the decoding attempt is successful, the UE 415 may process the decoded data packet accordingly.

In some examples, the UE 415 may identify the combining scheme based on a continuity of the K LLRs in the demodulation buffer. For example, the UE 415 may determine whether the encoded bits associated with the K LLRs correspond to consecutive encoded bits in the circular buffer for the first transmission. Put another way, the UE 415 may identify the combining scheme based on whether the contents of demodulation buffer look like a subset of the stored LLR circular buffer. For example, if RV4 is used, the encoded bits in the demodulation buffer may not be circularly contiguous (i.e., the contents of the demodulation buffer with LBRM may appear circular, but when unwrapped to combine with the unicast transmission (with no LBRM) the contents may not be contiguous anymore).

Continuing the RV4 example, the contents of the demodulation buffer (e.g., the encoded bits from the multicast transmission) may include two sets of contiguous LLRs that, although contiguous with respect to each other if processed under the second LBRM configuration, are not contiguous with respect to each other if processed under the first LBRM configuration. In such a scenario, the UE 415 may opt to forego combining (as in Alt. 3) or the UE 415 may select one of the contiguous sets (e.g., chunks, sequences) of LLRs in the demodulation buffer for combination with the LLRs stored in memory, among other options. If decoding the LLRs fails, the UE 415 may store a subset of the LLRs (e.g., the LLRs that were combined) in memory for a future combination procedure.

Although described with reference to LBRM 'off' and LBRM 'on', the techniques described herein may be implemented for other combinations of LBRM configurations. For example, both LBRM configurations may be for LBRM 'on' and first LBRM configuration may be a higher LBRM configuration than the second LBRM configuration (e.g., $N_{ref}$ for the first LBRM configuration may be larger than $N_{ref}$ for the second LBRM configuration).

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 5:
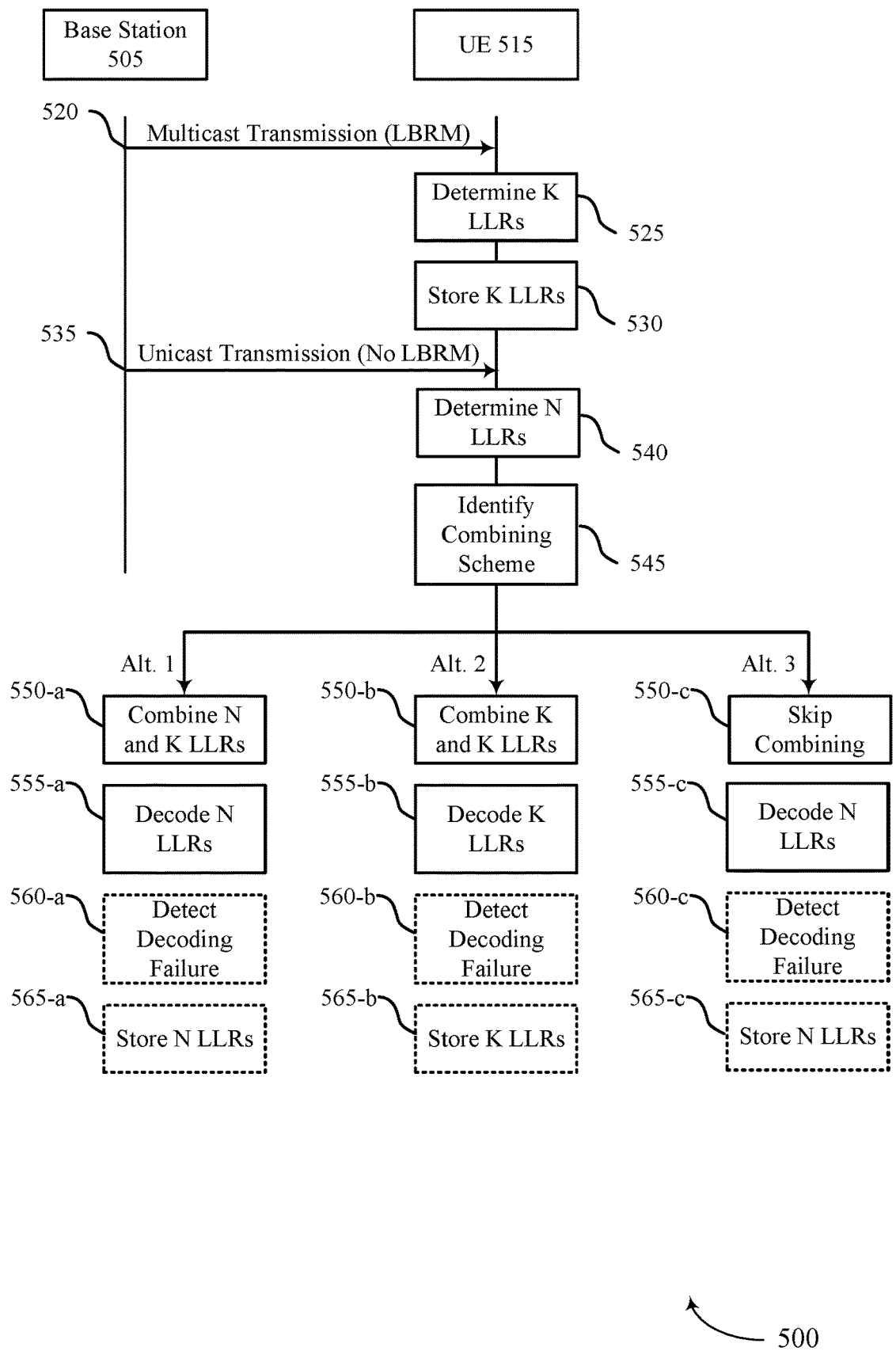
FIG. 5 illustrates an example of a process flow that supports combining with variable limited buffer rate matching in accordance with aspects of the present disclosure.

FIG. 5 illustrates an example of a process flow 500 that supports combining with variable limited buffer rate matching in accordance with aspects of the present disclosure. In some examples, the process flow 500 may be related to aspects of the wireless communications system 100 or the wireless communications system 200. For example, the process flow 500 may be implemented by a base station 505 and a UE 515, which may be examples of a base station and a UE as described herein. The process flow 500 may illustrate operations of the base station 505 and the UE 515 for Technique 2. In the process flow 500, an initial transmission for a data packet encoded to N bits may be a multicast transmission and a retransmission for the data packet may be a unicast transmission.

Prior to 520, the base station 505 may transmit, and the UE 515 may receive, indications of the LBRM configurations associated with different transmission types. For example, the base station 505 may indicate a first LBRM configuration associated with a first transmission type (e.g., multicast transmissions) and a second LBRM configuration associated with a second transmission type (e.g., unicast transmissions). In some examples, the UE 515 may transmit, and the base station 505 may receive, one or more indications of LBRM capabilities of the UE 515.

At 520, the base station 505 may transmit, and the UE 515 may receive, a multicast transmission for a data packet. The multicast transmission may be associated with the first LBRM configuration (e.g., LBRM set to 'on' with $N_{ref}=K$, where K is less than N). Thus, the multicast transmission may include K unique encoded bits of the data packet (e.g., encoded bits 1 through K for RV0), some or all of which may be repeated (e.g., depending on N and/or the capacity of the resources scheduled for the multicast transmission). At 525, the UE 515 may determine K LLRs for the multicast transmission (e.g., the UE 515 may determine an LLR for each of the K encoded bits included in the unicast transmission). The UE 515 may determine K LLRs for the multicast transmission based on the first LBRM configuration for the multicast transmission.

At 530, the UE 515 may store the K LLRs in memory. The UE 515 may store the K LLRs in memory based on the UE 515 failing to decode the K LLRs.

At 535, the base station 505 may transmit, and the UE 515 may receive, a unicast transmission that is associated with the second LBRM configuration (e.g., LBRM set to 'off' with $N_{ref}=N$). Thus, the unicast transmission may include N unique encoded bits (e.g., encoded bits 1 through N for RV0), some or all of which may be repeated (e.g., depending on N and/or the capacity of the resources scheduled for the unicast transmission). In some examples, the unicast transmission is in response to a NACK for the multicast transmission.

At 540, the UE 515 may determine N LLRs for the unicast transmission (e.g., the UE 515 may determine an LLR for each of the N encoded bits included in the unicast transmission). The UE 515 may determine the N LLRs for the unicast transmission based on the second LBRM configuration for the unicast transmission. In some examples, the N LLRs may be temporarily stored in a demodulation buffer.

At 545, the UE 515 may identify a combining scheme based on the second LBRM for the unicast transmission being different than the first LBRM configuration for the multicast transmission. At 550, the UE 515 may combine the LLRs in accordance with the combining scheme identified by the UE 515.

In a first alternative (Alt. 1) for the combining scheme, the UE 515 may, at 550-*a*, combine the N LLRs from the demodulation buffer with the K LLRs from memory. When combining the N LLRs and the K LLRs, the UE 515 may account for the difference in size between the N LLRs and the K LLRs. For example, the UE 515 may combine the LLRs for encoded bits 1 through K from the unicast transmission with the LLRs for encoded bits 1 through K from the multicast transmission. Thus, the UE 515 may generate a new set of N LLRs, K of which may be combined. After combining the LLRs, the UE 515 may continue processing the transmissions based on the combining scheme. For example, at 555-*a*, the UE 515 may attempt to decode the set of N LLRs. If, at 560-*a*, the UE 515 detects that the decoding attempt has failed, the UE 515 may, at 565-*a* store the set of N LLRs in memory. If the decoding attempt is successful, the UE 515 may process the decoded data packet accordingly.

In a second alternative (Alt. 2) for the combining scheme, the UE 515 may, at 550-*b*, combine K of the N LLRs from the demodulation buffer with the K LLRs from memory. However, the UE 515 may not use the K+1 though N LLRs from the unicast transmission. Thus, the UE 415 may generate a new set of K combined LLRs. After combining the LLRs, the UE 415 may continue processing the transmissions based on the combining scheme. For example, at 555-*b*, the UE 515 may attempt to decode the set of K combined LLRs. If, at 560-*b*, the UE 515 detects that the decoding attempt has failed, the UE 515 may, at 565-*b*, store the set of K combined LLRs in memory and discard the K+1 through N LLRs. If the decoding attempt is successful, the UE 515 may process the decoded data packet accordingly.

In a third alternative (Alt. 3) for the combining scheme, the UE 515 may skip combining at 550-*c* and may attempt to decode the set of N LLRs from the multicast transmission at 555-*c*. If, at 560-*c*, the UE 515 detects that the decoding attempt has failed, the UE 515 may, at 565-*c*, store the set of N LLRs in memory and discard the old K LLRs from the multicast transmission. If the decoding attempt is successful, the UE 515 may process the decoded data packet accordingly.

In some examples, the UE 515 may identify the combining scheme based on a continuity of the K LLRs in the memory. For example, the UE 515 may determine whether the encoded bits associated with the K LLRs correspond to consecutive encoded bits in the circular buffer for the first transmission. Put another way, the UE 515 may identify the combining scheme based on whether the LLR contents of the memory from the multicast transmission look like a subset of the LLR circular buffer. For example, if RV4 is used, the encoded bits in the memory may not be circularly contiguous (i.e., the contents of the memory with LBRM may appear circular, but when unwrapped to combine with the unicast transmission (with no LBRM) the contents may not be contiguous anymore).

Continuing the RV4 example, the contents of the memory (e.g., the encoded bits from the multicast transmission) may include two sets of contiguous LLRs that, although contiguous with respect to each other if processed under the second LBRM configuration, are not contiguous with respect to each other if processed under the first LBRM configuration. In such a scenario, the UE 515 may opt to forego combining (as in Alt. 3) or the UE 515 may select one of the contiguous sets of LLRs in the memory for combination with the LLRs in the demodulation buffer, among other options. If decoding the LLRs fails, the UE 515 may store a subset of the LLRs (e.g., the LLRs that were combined) in memory for a future combination procedure.

Although described with reference to LBRM 'on' and LBRM 'off', the techniques described herein may be implemented for other combinations of LBRM configurations. For example, both LBRM configurations may be for LBRM 'on' and first LBRM configuration may be a lower LBRM configuration than the second LBRM configuration (e.g., $N_{ref}$ for the first LBRM configuration may be smaller than $N_{ref}$ for the second LBRM configuration).

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 6:
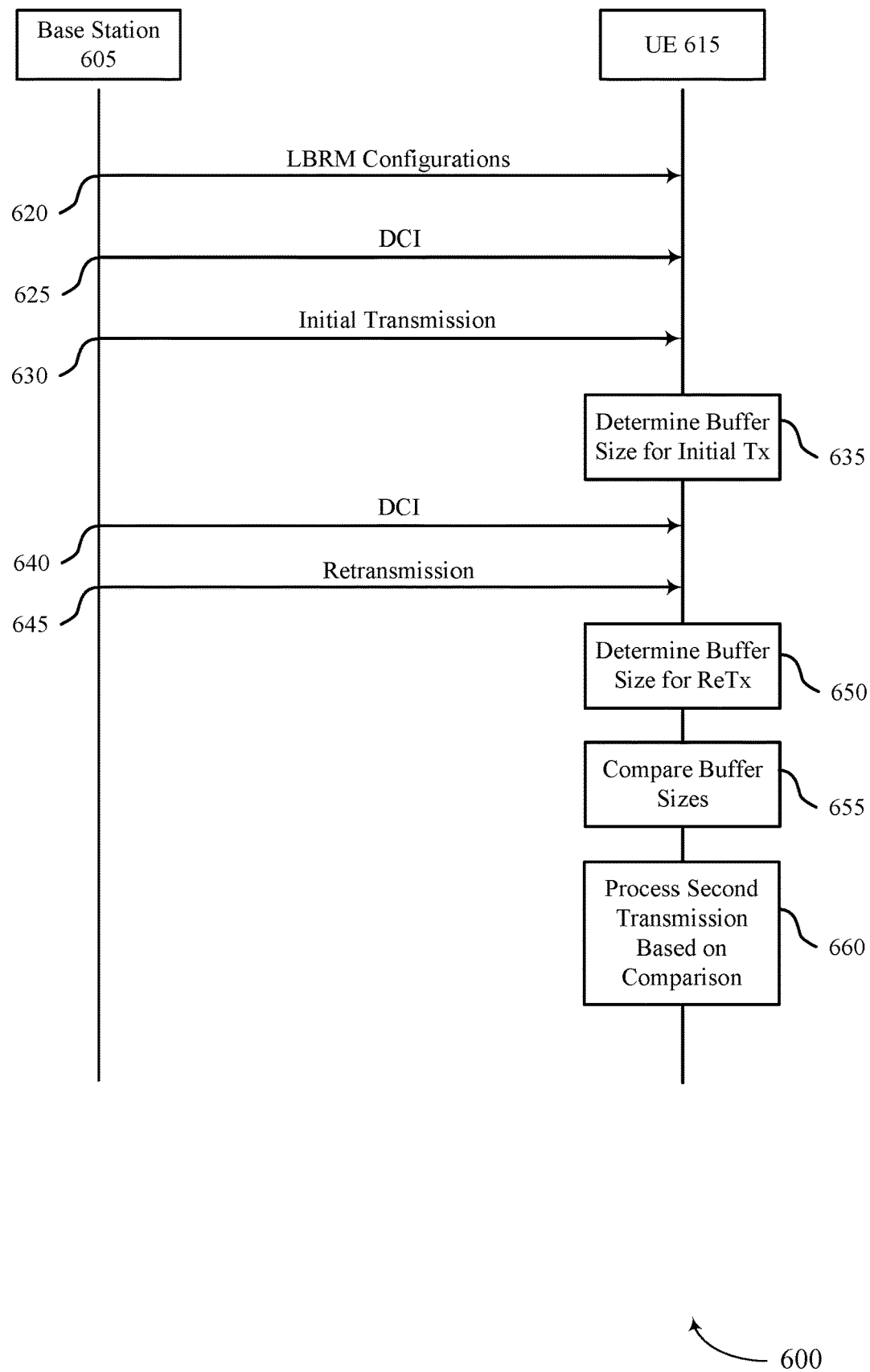
FIG. 6 illustrates an example of a process flow that supports combining with variable limited buffer rate matching in accordance with aspects of the present disclosure.

FIG. 6 illustrates an example of a process flow 600 that supports combining with variable limited buffer rate matching in accordance with aspects of the present disclosure. In some examples, the process flow 600 may be related to aspects of the wireless communications system 100 or the wireless communications system 200. For example, the process flow 600 may be implemented by a base station 605 and a UE 615, which may be examples of a base station and a UE as described herein. The process flow 600 may illustrate operations of the base station 605 and the UE 615 for Technique 3.

At 620, the base station 605 may transmit, and the UE 615 may receive, indications of LBRM configurations for different transmission types. For example, the base station 605 may indicate a first LBRM configuration associated with a first type of transmission (e.g., multicast transmissions) and a second LBRM configuration associated with a second type of transmission (e.g., unicast transmission). In some examples, the first LBRM configuration is associated with a first $N_{ref}$ value and the second LBRM configuration is associated with a second $N_{ref}$ value. The indication of the first LBRM configuration and the indication of the second LBRM configuration may be included in the same message (e.g., an RRC message) or in different messages.

At 625, the base station 605 may transmit, and the UE 615 may receive, DCI for an initial transmission for a data packet. The DCI may schedule the initial transmission and indicate N and/or the capacity of the resources scheduled for the initial transmission. At 630, the base station 605 may perform an initial transmission for the data packet using the resources scheduled by the DCI. The initial transmission may be performed in accordance with (e.g., using) the first LBRM configuration.

At 635, the UE 615 may determine a buffer size (e.g., Neb) for the initial transmission. The UE 615 may calculate the buffer size based on $N_{ref}$ and N for the initial transmission. For example, the UE 615 may calculate the buffer size as the minimum of N and $N_{ref}$ (e.g., min(N, $N_{ref}$)).

At 640, the base station 605 may transmit, and the UE 615 may receive, DCI for a retransmission for the data packet. The DCI may schedule the retransmission and indicate N and/or the capacity of the resources scheduled for the retransmission. At 645, the base station 605 may perform a retransmission for the data packet using the resources scheduled by the DCI. The retransmission may be performed in accordance with (e.g., using) the second LBRM configuration.

At 650, the UE 615 may determine a buffer size (e.g., Neb) for the retransmission. The UE 615 may calculate the buffer size based on $N_{ref}$ and N for the retransmission. For example, the UE 615 may calculate the buffer size as the minimum of N and $N_{ref}$ (e.g., min(N, $N_{ref}$)).

At 655, the UE 615 may compare the buffer sizes for the transmissions based on the transmissions having different LBRM configurations. At 660, the UE 615 may process the retransmission based on the comparison at 655. In a first example, the UE 615 may determine whether the buffer size for the retransmission is different than the buffer size for the initial transmission. If the buffer size for the retransmission is different than the buffer size for the initial transmission, the UE 615 may determine that the retransmission is an error (e.g., because the UE 516 expects to compute the buffer size value for the initial transmission and the retransmission) and process the retransmission accordingly. If the buffer size for the retransmission the same as the buffer size for the initial transmission, the UE 615 may determine that the retransmission is not an error and process the retransmission accordingly.

In a second example, the UE 615 may determine whether the buffer size for the retransmission is larger than the buffer size for the initial transmission. If the buffer size for the retransmission is larger than the buffer size for the initial transmission, the UE 615 may determine that the retransmission is not an error and process the retransmission accordingly. If the buffer size for the retransmission smaller than the buffer size for the initial transmission, the UE 615 may determine that the retransmission is an error and process the retransmission accordingly.

In a third example, the UE 615 may determine whether the buffer size for the retransmission is smaller than the buffer size for the initial transmission. If the buffer size for the retransmission is smaller than the buffer size for the initial transmission, the UE 615 may determine that the retransmission is not an error and process the retransmission accordingly. If the buffer size for the retransmission larger than the buffer size for the initial transmission, the UE 615 may determine that the retransmission is an error and process the retransmission accordingly.

Technique 3 may allow for different LBRM configurations for multicast transmissions and unicast transmissions (but may not allow mixed transmissions for the transport block sizes for which the LBRM applies).

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 7:
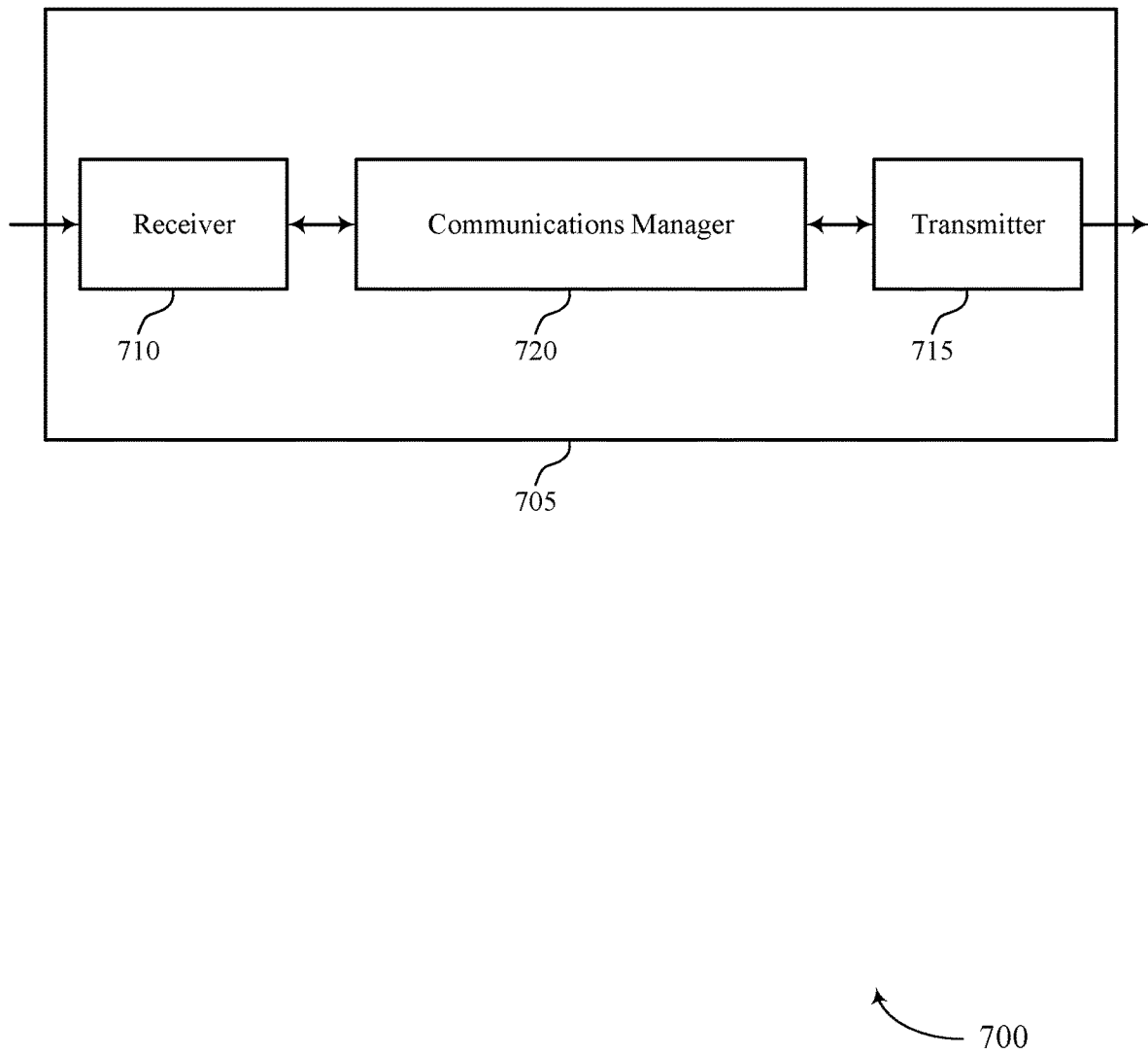
FIGS. 7 and 8 show block diagrams of devices that support combining with variable limited buffer rate matching in accordance with aspects of the present disclosure.

FIG. 7 shows a block diagram 700 of a device 705 that supports combining with variable limited buffer rate matching in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to combining with variable limited buffer rate matching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to combining with variable limited buffer rate matching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of combining with variable limited buffer rate matching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving control signaling identifying a first limited buffer rate matching configuration associated with multicast transmissions and a second limited buffer rate matching configuration associated with unicast transmissions. The communications manager 720 may be configured as or otherwise support a means for processing, using the first limited buffer rate matching configuration, a multicast message including encoded bits of a data packet. The communications manager 720 may be configured as or otherwise support a means for processing, using the first limited buffer rate matching configuration, a unicast message based on the unicast message including a re-transmission of the encoded bits of the data packet.

Additionally or alternatively, the communications manager 720 may support wireless communication at a UE in accordance with examples as disclosed herein. For example, the communications manager 720 may be configured as or otherwise support a means for receiving a first transmission including encoded bits of a data packet, the first transmission associated with a first limited buffer rate matching configuration. The communications manager 720 may be configured as or otherwise support a means for receiving a second transmission including some or all of the encoded bits of the data packet, the second transmission associated with a second limited buffer rate matching configuration that is different from the first limited buffer rate matching configuration. The communications manager 720 may be configured as or otherwise support a means for identifying a combining scheme for the first and second transmissions based on the second limited buffer rate matching configuration being different than the first limited buffer rate matching configuration. The communications manager 720 may be configured as or otherwise support a means for processing the second transmission in accordance with the combining scheme.

Additionally or alternatively, the communications manager 720 may support wireless communication at a UE in accordance with examples as disclosed herein. For example, the communications manager 720 may be configured as or otherwise support a means for receiving a first transmission including encoded bits of a data packet, the first transmission associated with a first limited buffer rate matching configuration. The communications manager 720 may be configured as or otherwise support a means for receiving a second transmission including some or all of the encoded bits of the data packet, the second transmission associated with a second limited buffer rate matching configuration that is different from the first limited buffer rate matching configuration. The communications manager 720 may be configured as or otherwise support a means for comparing, basing at least in part on the second limited buffer rate matching configuration being different from the first limited buffer rate matching configuration, a first buffer size associated with the first transmission and a second buffer size associated with the second transmission. The communications manager 720 may be configured as or otherwise support a means for processing the second transmission based on the comparison of the first buffer size and the second buffer size.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for improved communication reliability, reduced processing, and more efficient utilization of communication resources.

Figure 8:
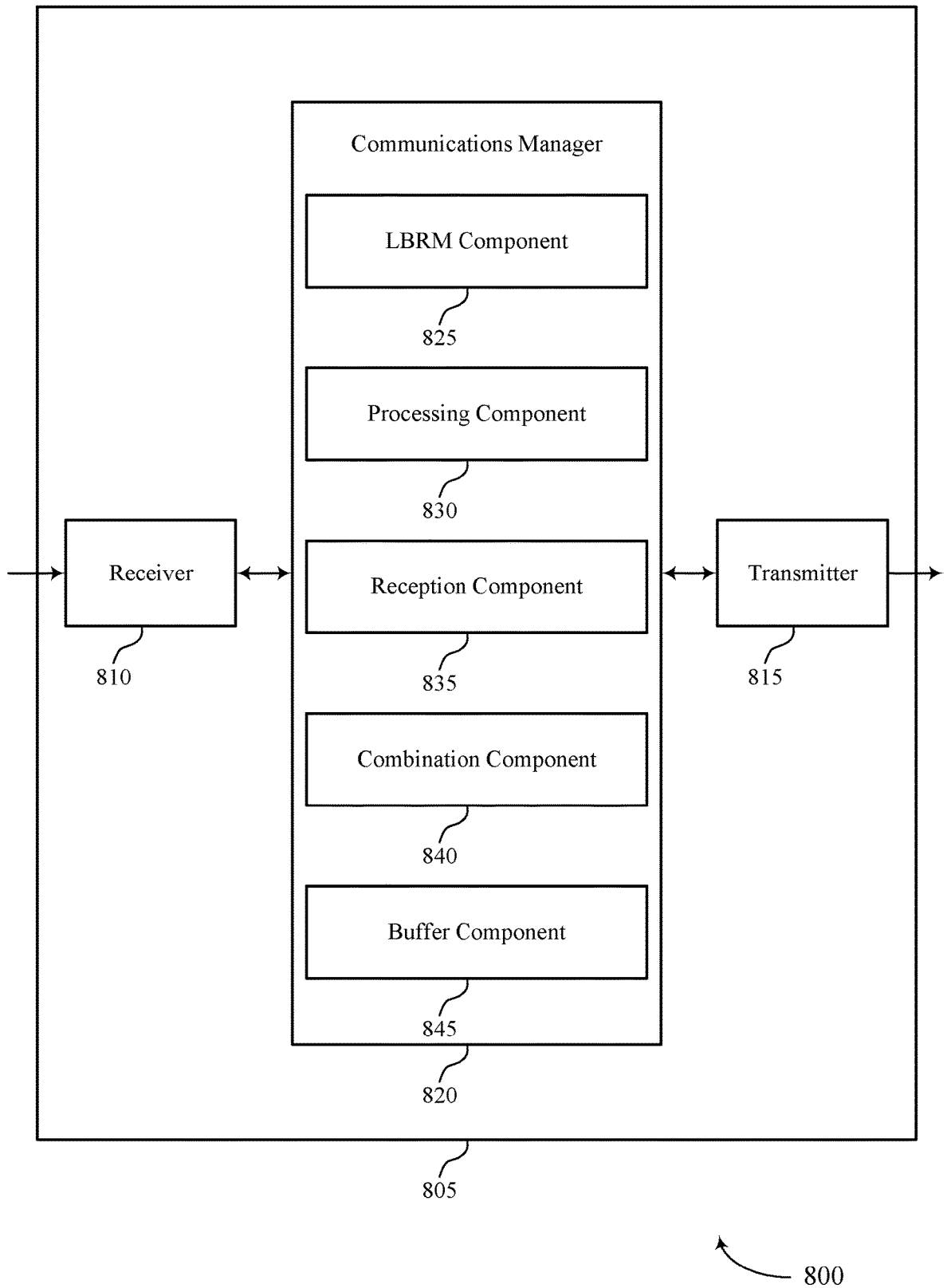

FIG. 8 shows a block diagram 800 of a device 805 that supports combining with variable limited buffer rate matching in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to combining with variable limited buffer rate matching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to combining with variable limited buffer rate matching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of combining with variable limited buffer rate matching as described herein. For example, the communications manager 820 may include an LBRM component 825, a processing component 830, a reception component 835, a combination component 840, a buffer component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The LBRM component 825 may be configured as or otherwise support a means for receiving control signaling identifying a first limited buffer rate matching configuration associated with multicast transmissions and a second limited buffer rate matching configuration associated with unicast transmissions. The processing component 830 may be configured as or otherwise support a means for processing, using the first limited buffer rate matching configuration, a multicast message including encoded bits of a data packet. The processing component 830 may be configured as or otherwise support a means for processing, using the first limited buffer rate matching configuration, a unicast message based on the unicast message including a re-transmission of the encoded bits of the data packet.

Additionally or alternatively, the communications manager 820 may support wireless communication at a UE in accordance with examples as disclosed herein. The reception component 835 may be configured as or otherwise support a means for receiving a first transmission including encoded bits of a data packet, the first transmission associated with a first limited buffer rate matching configuration. The reception component 835 may be configured as or otherwise support a means for receiving a second transmission including some or all of the encoded bits of the data packet, the second transmission associated with a second limited buffer rate matching configuration that is different from the first limited buffer rate matching configuration. The combination component 840 may be configured as or otherwise support a means for identifying a combining scheme for the first and second transmissions based on the second limited buffer rate matching configuration being different than the first limited buffer rate matching configuration. The processing component 830 may be configured as or otherwise support a means for processing the second transmission in accordance with the combining scheme.

Additionally or alternatively, the communications manager 820 may support wireless communication at a UE in accordance with examples as disclosed herein. The reception component 835 may be configured as or otherwise support a means for receiving a first transmission including encoded bits of a data packet, the first transmission associated with a first limited buffer rate matching configuration. The reception component 835 may be configured as or otherwise support a means for receiving a second transmission including some or all of the encoded bits of the data packet, the second transmission associated with a second limited buffer rate matching configuration that is different from the first limited buffer rate matching configuration. The buffer component 845 may be configured as or otherwise support a means for comparing, based on the second limited buffer rate matching configuration being different from the first limited buffer rate matching configuration, a first buffer size associated with the first transmission and a second buffer size associated with the second transmission. The processing component 830 may be configured as or otherwise support a means for processing the second transmission based on the comparison of the first buffer size and the second buffer size.

Figure 9:
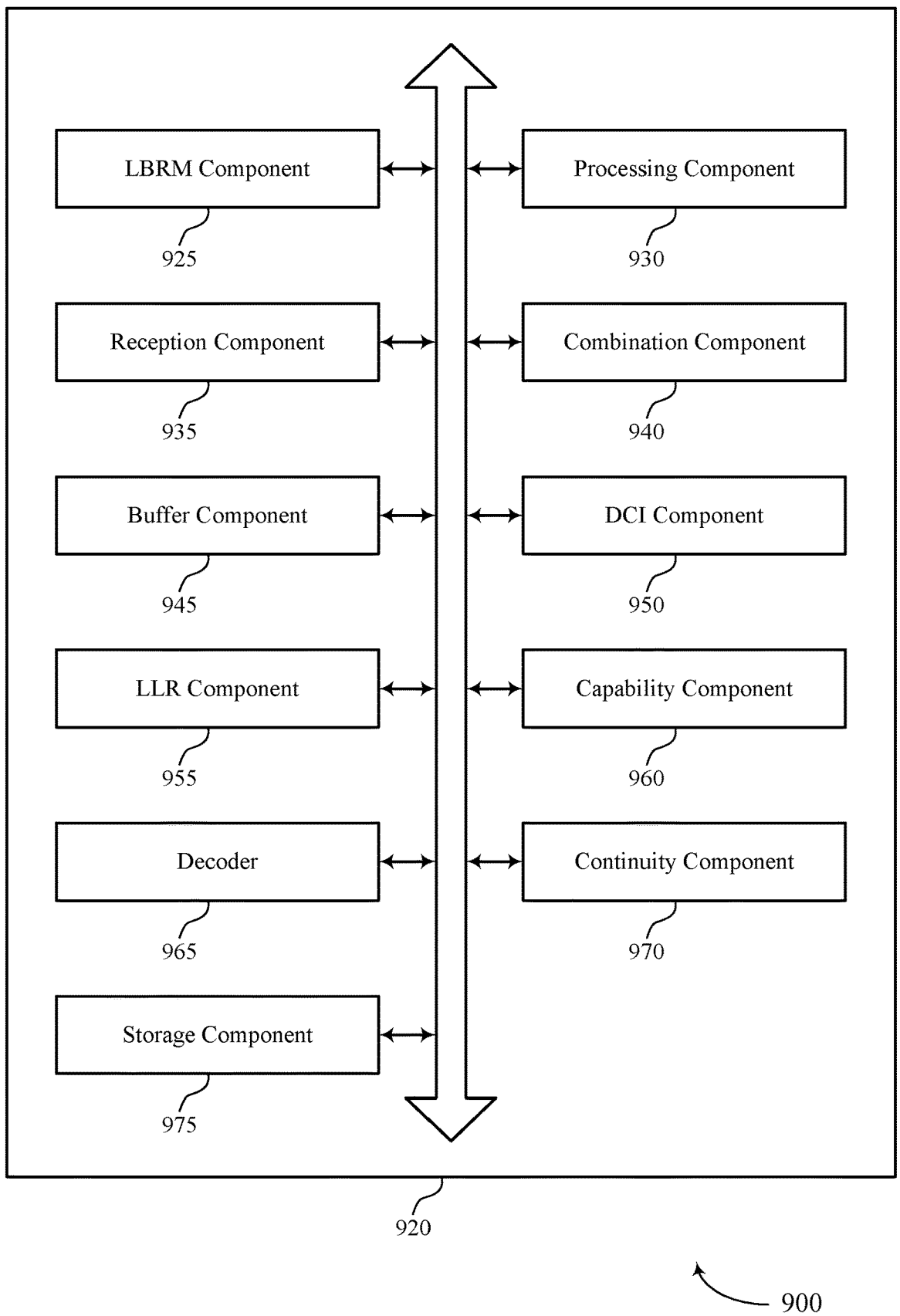
FIG. 9 shows a block diagram of a communications manager that supports combining with variable limited buffer rate matching in accordance with aspects of the present disclosure.

FIG. 9 shows a block diagram 900 of a communications manager 920 that supports combining with variable limited buffer rate matching in accordance with aspects of the present disclosure. The communications manager 920 may be an example of aspects of a communications manager 720, a communications manager 820, or both, as described herein. The communications manager 920, or various components thereof, may be an example of means for performing various aspects of combining with variable limited buffer rate matching as described herein. For example, the communications manager 920 may include an LBRM component 925, a processing component 930, a reception component 935, a combination component 940, a buffer component 945, a DCI component 950, an LLR component 955, a capability component 960, a decoder 965, a continuity component 970, a storage component 975, or any combination thereof. Each of these components may communicate, directly or indirectly, with one another (e.g., via one or more buses).

The communications manager 920 may support wireless communication at a UE in accordance with examples as disclosed herein. The LBRM component 925 may be configured as or otherwise support a means for receiving control signaling identifying a first limited buffer rate matching configuration associated with multicast transmissions and a second limited buffer rate matching configuration associated with unicast transmissions. The processing component 930 may be configured as or otherwise support a means for processing, using the first limited buffer rate matching configuration, a multicast message including encoded bits of a data packet. In some examples, the processing component 930 may be configured as or otherwise support a means for processing, using the first limited buffer rate matching configuration, a unicast message based on the unicast message including a re-transmission of the encoded bits of the data packet.

In some examples, the DCI component 950 may be configured as or otherwise support a means for receiving, for the multicast message, first downlink control information that indicates a group identifier for the multicast message, where the multicast message is processed using the first limited buffer rate matching configuration based on the group identifier being associated with the first limited buffer rate matching configuration. In some examples, the DCI component 950 may be configured as or otherwise support a means for receiving, for the unicast message, second downlink control information that indicates a cell identifier for the unicast message, where the multicast message is processed using the first limited buffer rate matching configuration based on the cell identifier being associated with the group identifier.

In some examples, the multicast message is associated with a group identifier and the unicast message is associated with a cell identifier, and the DCI component 950 may be configured as or otherwise support a means for receiving, for the unicast message, downlink control information that indicates the unicast message is associated with the group identifier, where the unicast message is processed using the first limited buffer rate matching configuration based on the downlink control information indicating that the unicast message is associated with the group identifier.

In some examples, the first limited buffer rate matching configuration indicates a threshold quantity of encoded bits permitted to be input into a circular buffer at a base station.

Additionally or alternatively, the communications manager 920 may support wireless communication at a UE in accordance with examples as disclosed herein. The reception component 935 may be configured as or otherwise support a means for receiving a first transmission including encoded bits of a data packet, the first transmission associated with a first limited buffer rate matching configuration.

In some examples, the reception component 935 may be configured as or otherwise support a means for receiving a second transmission including some or all of the encoded bits of the data packet, the second transmission associated with a second limited buffer rate matching configuration that is different from the first limited buffer rate matching configuration. The combination component 940 may be configured as or otherwise support a means for identifying a combining scheme for the first and second transmissions based on the second limited buffer rate matching configuration being different than the first limited buffer rate matching configuration. In some examples, the processing component 930 may be configured as or otherwise support a means for processing the second transmission in accordance with the combining scheme.

In some examples, the first transmission includes a multicast transmission and the second transmission includes a unicast transmission.

In some examples, the first transmission includes a unicast transmission and the second transmission includes a multicast transmission.

In some examples, the LLR component 955 may be configured as or otherwise support a means for determining a first set of LLRs based on the first transmission, the first set of LLRs including a first quantity of LLRs. In some examples, the LLR component 955 may be configured as or otherwise support a means for determining a second set of LLRs based on the second transmission, the second set of LLRs including a second quantity of LLRs different than the first quantity.

In some examples, the first set of LLRs is determined based on the first limited buffer rate matching configuration and the second set of LLRs is determined based on the second limited buffer rate matching configuration.

In some examples, to support processing the second transmission, the combination component 940 may be configured as or otherwise support a means for combining the first set of LLRs with the second set of LLRs to generate a combined set of LLRs, the combining based on a difference between the first quantity and the second quantity. In some examples, to support processing the second transmission, the decoder 965 may be configured as or otherwise support a means for attempting to decode the combined set of LLRs based on a size difference between the first quantity and the second quantity.

In some examples, the storage component 975 may be configured as or otherwise support a means for storing the combined set of LLRs in memory based on a failure of the attempt to decode the combined set of LLRs, the combined set of LLRs based on a size difference between the first quantity and the second quantity.

In some examples, to support processing the second transmission, the combination component 940 may be configured as or otherwise support a means for combining the first set of LLRs with a subset of the second set of LLRs to generate a combined set of LLRs, the subset of the second set of LLRs including the first quantity. In some examples, to support processing the second transmission, the decoder 965 may be configured as or otherwise support a means for attempting to decode the combined set of LLRs, the combined set of LLRs including the first quantity.

In some examples, the storage component 975 may be configured as or otherwise support a means for storing the combined set of LLRs in memory based on a failure of the attempt to decode the combined set of LLRs.

In some examples, to support processing the second transmission, the decoder 965 may be configured as or otherwise support a means for attempting to decode the second set of LLRs independent of the first set of LLRs.

In some examples, the storage component 975 may be configured as or otherwise support a means for storing the second set of LLRs in memory, and discarding the first set of LLRs, based on a failure of the attempt to decode the second set of LLRs.

In some examples, the first set of LLRs is associated with a first set of encoded bits that includes the encoded bits and the second set of LLRs is associated with a second set of encoded bits that includes the encoded bits, and the continuity component 970 may be configured as or otherwise support a means for determining whether the second set of encoded bits corresponds to encoded bits in the first set of encoded bits that were consecutively stored in a circular buffer at a base station, where the combining scheme is identified based on the determination.

In some examples, the continuity component 970 may be configured as or otherwise support a means for combining a subset of the second set of LLRs with the first set of LLRs to generate a combined set of LLRs, the combining based on the second set of encoded bits corresponding to encoded bits in the first set of encoded bits that were nonconsecutively stored in the circular buffer. In some examples, the decoder 965 may be configured as or otherwise support a means for attempting to decode the combined set of LLRs.

In some examples, the LBRM component 925 may be configured as or otherwise support a means for receiving an indication that the first limited buffer rate matching configuration is associated with transmissions of a first type, where the first transmission is of the first type. In some examples, the LBRM component 925 may be configured as or otherwise support a means for receiving an indication that the second limited buffer rate matching configuration is associated with transmissions of a second type, where the second transmission is of the second type.

In some examples, the capability component 960 may be configured as or otherwise support a means for indicating a capability of the UE to combine transmissions associated with different limited buffer rate matching configurations, where the combining scheme is based on the capability of the UE.

In some examples, the capability component 960 may be configured as or otherwise support a means for indicating a capability of the UE to support different limited buffer rate matching configurations for different transmission types, where the combining scheme is based on the capability of the UE.

In some examples, the capability component 960 may be configured as or otherwise support a means for indicating, to a base station, a quantity of limited buffer rate matching configurations the UE is capable of supporting for a component carrier.

Additionally or alternatively, the communications manager 920 may support wireless communication at a UE in accordance with examples as disclosed herein. In some examples, the reception component 935 may be configured as or otherwise support a means for receiving a first transmission including encoded bits of a data packet, the first transmission associated with a first limited buffer rate matching configuration. In some examples, the reception component 935 may be configured as or otherwise support a means for receiving a second transmission including some or all of the encoded bits of the data packet, the second transmission associated with a second limited buffer rate matching configuration that is different from the first limited buffer rate matching configuration. The buffer component 945 may be configured as or otherwise support a means for comparing, based on the second limited buffer rate matching configuration being different from the first limited buffer rate matching configuration, a first buffer size associated with the first transmission and a second buffer size associated with the second transmission. In some examples, the processing component 930 may be configured as or otherwise support a means for processing the second transmission based on the comparison of the first buffer size and the second buffer size.

In some examples, the buffer component 945 may be configured as or otherwise support a means for determining, based on the comparison, that the second buffer size is different than the first buffer size, where processing the second transmission includes identifying the second transmission as an error.

In some examples, the buffer component 945 may be configured as or otherwise support a means for determining, based on the comparison, that the second buffer size is equal to the first buffer size, where processing the second transmission includes combining the second transmission with the first transmission based on the determination.

In some examples, the buffer component 945 may be configured as or otherwise support a means for determining, based on the comparison, that the second buffer size is smaller than the first buffer size, where processing the second transmission includes identifying the second transmission as an error.

In some examples, the buffer component 945 may be configured as or otherwise support a means for determining, based on the comparison, that the second buffer size is larger than the first buffer size, where processing the second transmission includes combining the second transmission with the first transmission based on the determination.

In some examples, the buffer component 945 may be configured as or otherwise support a means for determining the first buffer size based on a first quantity of encoded bits associated with a transport block size for the first transmission and a second quantity of encoded bits associated with a circular buffer at a base station. In some examples, the buffer component 945 may be configured as or otherwise support a means for determining the second buffer size based on a third quantity of encoded bits associated with a transport block size for the second transmission and a fourth quantity of encoded bits associated with the circular buffer at the base station.

Figure 10:
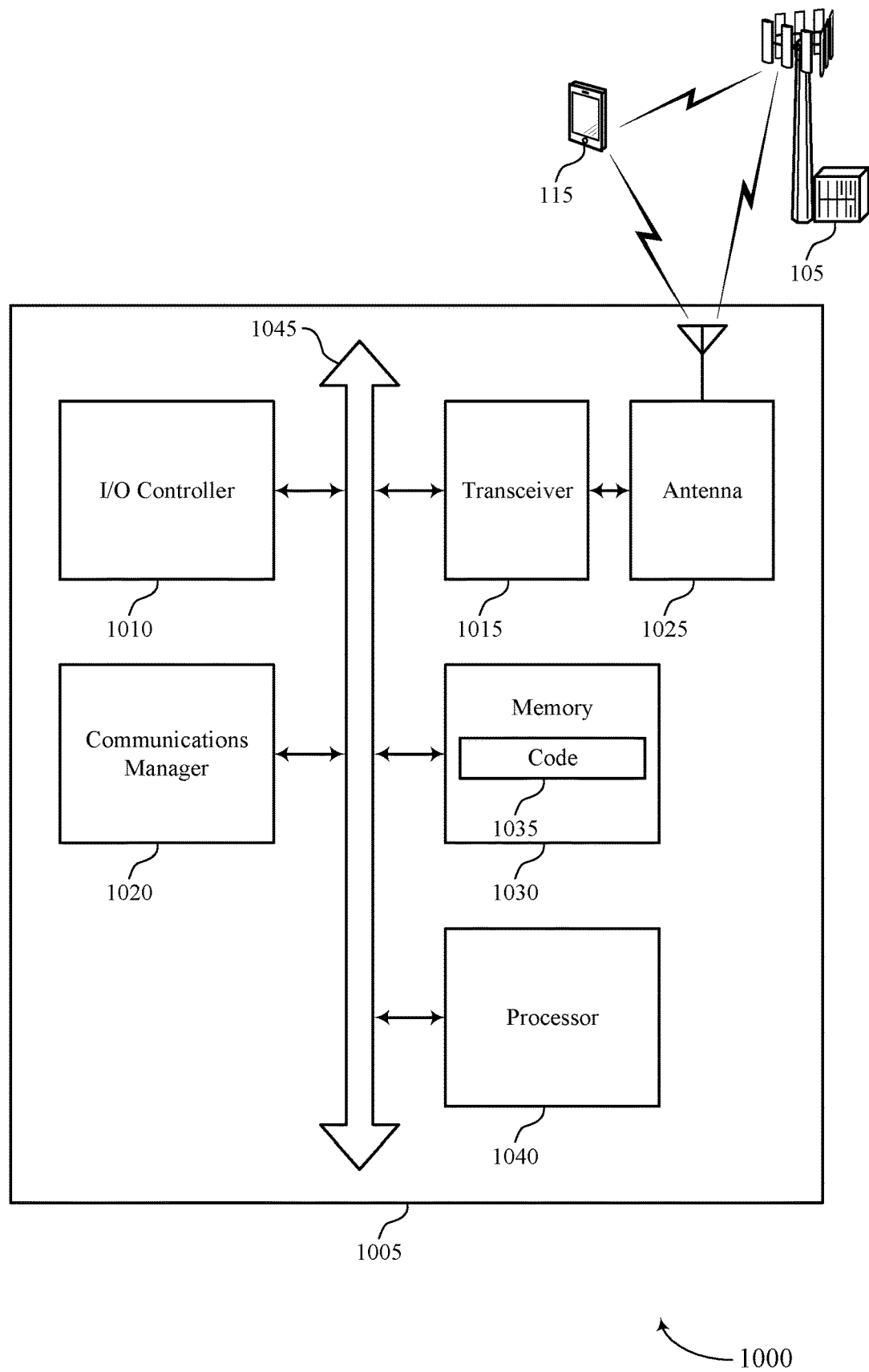
FIG. 10 shows a diagram of a system including a device that supports combining with variable limited buffer rate matching in accordance with aspects of the present disclosure.

FIG. 10 shows a diagram of a system 1000 including a device 1005 that supports combining with variable limited buffer rate matching in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting combining with variable limited buffer rate matching). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving control signaling identifying a first limited buffer rate matching configuration associated with multicast transmissions and a second limited buffer rate matching configuration associated with unicast transmissions. The communications manager 1020 may be configured as or otherwise support a means for processing, using the first limited buffer rate matching configuration, a multicast message including encoded bits of a data packet. The communications manager 1020 may be configured as or otherwise support a means for processing, using the first limited buffer rate matching configuration, a unicast message based on the unicast message including a re-transmission of the encoded bits of the data packet.

Additionally or alternatively, the communications manager 1020 may support wireless communication at a UE in accordance with examples as disclosed herein. For example, the communications manager 1020 may be configured as or otherwise support a means for receiving a first transmission including encoded bits of a data packet, the first transmission associated with a first limited buffer rate matching configuration. The communications manager 1020 may be configured as or otherwise support a means for receiving a second transmission including some or all of the encoded bits of the data packet, the second transmission associated with a second limited buffer rate matching configuration that is different from the first limited buffer rate matching configuration. The communications manager 1020 may be configured as or otherwise support a means for identifying a combining scheme for the first and second transmissions based on the second limited buffer rate matching configuration being different than the first limited buffer rate matching configuration. The communications manager 1020 may be configured as or otherwise support a means for processing the second transmission in accordance with the combining scheme.

Additionally or alternatively, the communications manager 1020 may support wireless communication at a UE in accordance with examples as disclosed herein. For example, the communications manager 1020 may be configured as or otherwise support a means for receiving a first transmission including encoded bits of a data packet, the first transmission associated with a first limited buffer rate matching configuration. The communications manager 1020 may be configured as or otherwise support a means for receiving a second transmission including some or all of the encoded bits of the data packet, the second transmission associated with a second limited buffer rate matching configuration that is different from the first limited buffer rate matching configuration. The communications manager 1020 may be configured as or otherwise support a means for comparing, basing at least in part on the second limited buffer rate matching configuration being different from the first limited buffer rate matching configuration, a first buffer size associated with the first transmission and a second buffer size associated with the second transmission. The communications manager 1020 may be configured as or otherwise support a means for processing the second transmission based on the comparison of the first buffer size and the second buffer size.

By including or configuring the communications manager 1020 in accordance with examples as described herein, the device 1005 may support techniques for improved communication reliability, improved user experience related to reduced processing, and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of combining with variable limited buffer rate matching as described herein, or the processor 1040 and the memory 1030 may be otherwise configured to perform or support such operations.

Figure 11:
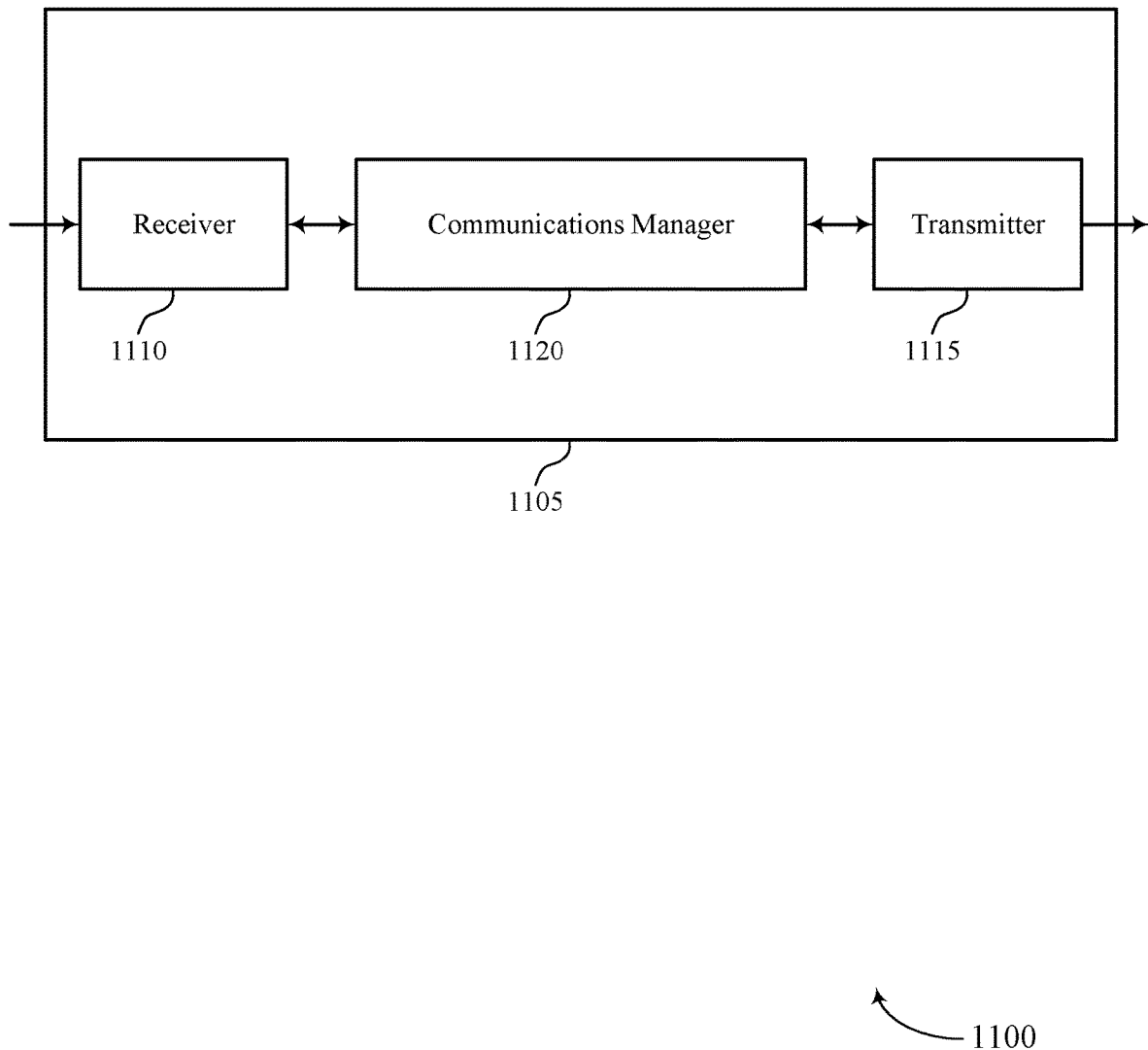
FIGS. 11 and 12 show block diagrams of devices that support combining with variable limited buffer rate matching in accordance with aspects of the present disclosure.

FIG. 11 shows a block diagram 1100 of a device 1105 that supports combining with variable limited buffer rate matching in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to combining with variable limited buffer rate matching). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to combining with variable limited buffer rate matching). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of combining with variable limited buffer rate matching as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting control signaling identifying a first limited buffer rate matching configuration associated with multicast transmissions and a second a second limited buffer rate matching configuration associated with unicast transmissions. The communications manager 1120 may be configured as or otherwise support a means for using the first limited buffer rate matching configuration for a multicast message including encoded bits of a data packet. The communications manager 1120 may be configured as or otherwise support a means for using the first limited buffer rate matching configuration for a unicast message based on the unicast message including a re-transmission of the encoded bits or the data packet.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for improved communication reliability, reduced processing, and more efficient utilization of communication resources.

Figure 12:
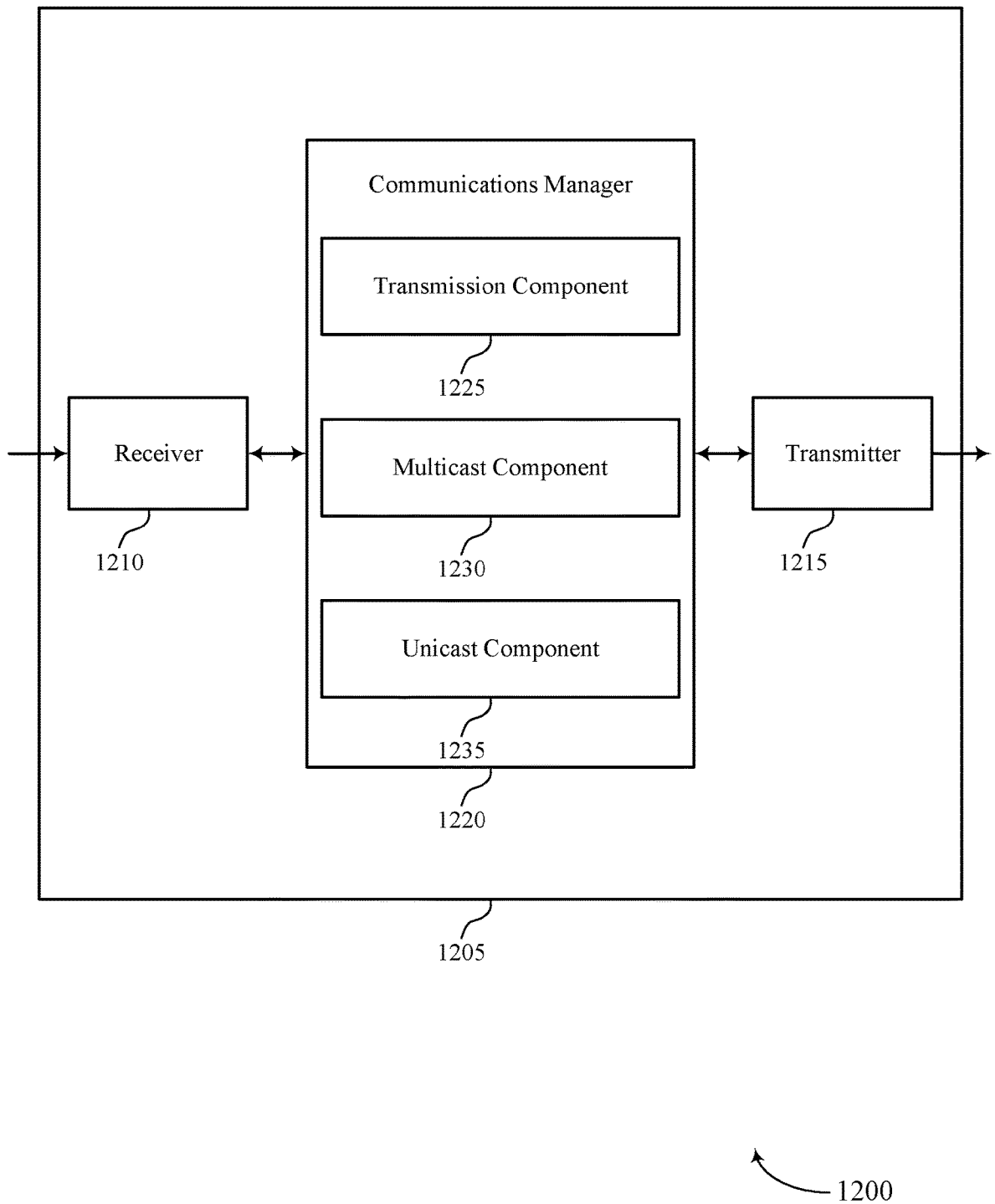

FIG. 12 shows a block diagram 1200 of a device 1205 that supports combining with variable limited buffer rate matching in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to combining with variable limited buffer rate matching). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to combining with variable limited buffer rate matching). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of combining with variable limited buffer rate matching as described herein. For example, the communications manager 1220 may include a transmission component 1225, a multicast component 1230, a unicast component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The transmission component 1225 may be configured as or otherwise support a means for transmitting control signaling identifying a first limited buffer rate matching configuration associated with multicast transmissions and a second a second limited buffer rate matching configuration associated with unicast transmissions. The multicast component 1230 may be configured as or otherwise support a means for using the first limited buffer rate matching configuration for a multicast message including encoded bits of a data packet. The unicast component 1235 may be configured as or otherwise support a means for using the first limited buffer rate matching configuration for a unicast message based on the unicast message including a re-transmission of the encoded bits or the data packet.

Figure 13:
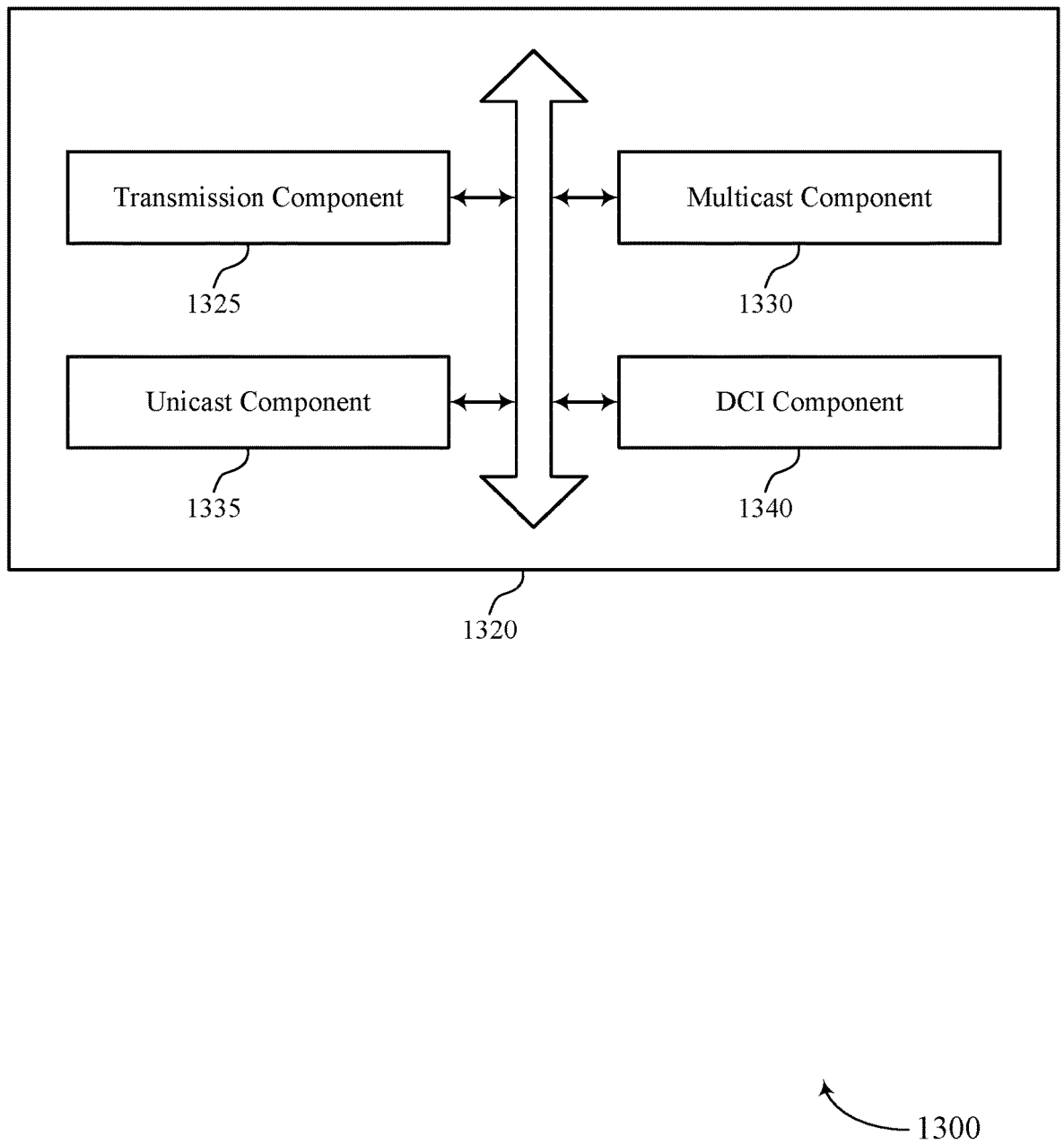
FIG. 13 shows a block diagram of a communications manager that supports combining with variable limited buffer rate matching in accordance with aspects of the present disclosure.

FIG. 13 shows a block diagram 1300 of a communications manager 1320 that supports combining with variable limited buffer rate matching in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of combining with variable limited buffer rate matching as described herein. For example, the communications manager 1320 may include a transmission component 1325, a multicast component 1330, a unicast component 1335, a DCI component 1340, or any combination thereof. Each of these components may communicate, directly or indirectly, with one another (e.g., via one or more buses).

The communications manager 1320 may support wireless communication at a base station in accordance with examples as disclosed herein. The transmission component 1325 may be configured as or otherwise support a means for transmitting control signaling identifying a first limited buffer rate matching configuration associated with multicast transmissions and a second a second limited buffer rate matching configuration associated with unicast transmissions. The multicast component 1330 may be configured as or otherwise support a means for using the first limited buffer rate matching configuration for a multicast message including encoded bits of a data packet. The unicast component 1335 may be configured as or otherwise support a means for using the first limited buffer rate matching configuration for a unicast message based on the unicast message including a re-transmission of the encoded bits or the data packet.

In some examples, the DCI component 1340 may be configured as or otherwise support a means for transmitting, for the multicast message, first downlink control information that indicates a group identifier for the multicast message, the group identifier associated with the first limited buffer rate matching configuration. In some examples, the DCI component 1340 may be configured as or otherwise support a means for transmitting, for the unicast message, second downlink control information that indicates a cell identifier for the unicast message, where the multicast message is processed using the first limited buffer rate matching configuration based on the cell identifier being associated with the group identifier.

In some examples, the multicast message is associated with a group identifier and the unicast message is associated with a cell identifier, and the DCI component 1340 may be configured as or otherwise support a means for transmitting, for the unicast message, downlink control information that indicates the unicast message is associated with the group identifier.

Figure 14:
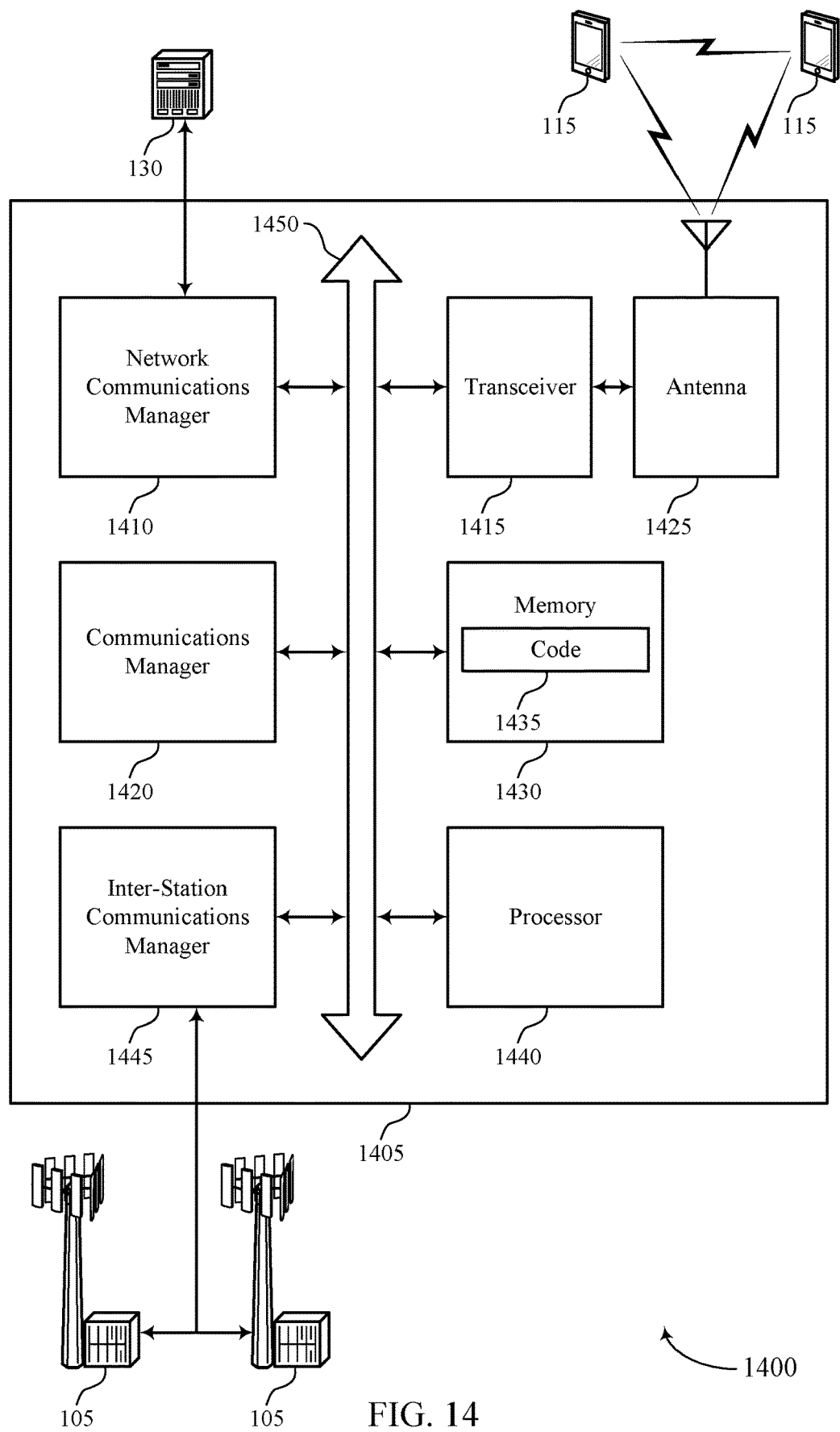
FIG. 14 shows a diagram of a system including a device that supports combining with variable limited buffer rate matching in accordance with aspects of the present disclosure.

FIG. 14 shows a diagram of a system 1400 including a device 1405 that supports combining with variable limited buffer rate matching in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting combining with variable limited buffer rate matching). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting control signaling identifying a first limited buffer rate matching configuration associated with multicast transmissions and a second a second limited buffer rate matching configuration associated with unicast transmissions. The communications manager 1420 may be configured as or otherwise support a means for using the first limited buffer rate matching configuration for a multicast message including encoded bits of a data packet. The communications manager 1420 may be configured as or otherwise support a means for using the first limited buffer rate matching configuration for a unicast message based on the unicast message including a re-transmission of the encoded bits or the data packet.

By including or configuring the communications manager 1420 in accordance with examples as described herein, the device 1405 may support techniques for improved communication reliability, improved user experience related to reduced processing, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of combining with variable limited buffer rate matching as described herein, or the processor 1440 and the memory 1430 may be otherwise configured to perform or support such operations.

Figure 15:
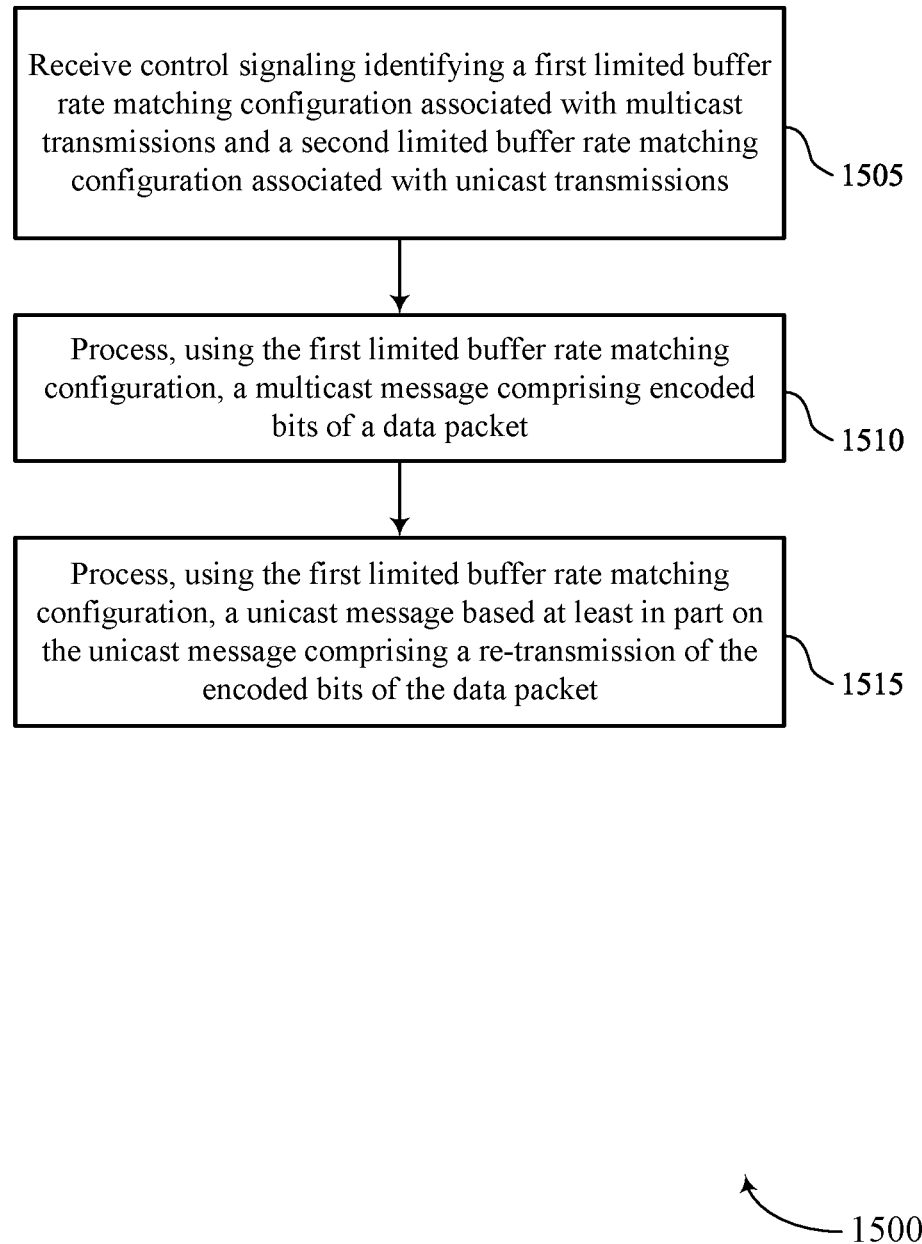
FIGS. 15 through 18 show flowcharts illustrating methods that support combining with variable limited buffer rate matching in accordance with aspects of the present disclosure.

FIG. 15 shows a flowchart illustrating a method 1500 that supports combining with variable limited buffer rate matching in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving control signaling identifying a first limited buffer rate matching configuration associated with multicast transmissions and a second limited buffer rate matching configuration associated with unicast transmissions. The operations of 1505 may be performed in accordance with examples as disclosed herein. In some examples, aspects of the operations of 1505 may be performed by an LBRM component 925 as described with reference to FIG. 9.

At 1510, the method may include processing, using the first limited buffer rate matching configuration, a multicast message including encoded bits of a data packet. The operations of 1510 may be performed in accordance with examples as disclosed herein. In some examples, aspects of the operations of 1510 may be performed by a processing component 930 as described with reference to FIG. 9.

At 1515, the method may include processing, using the first limited buffer rate matching configuration, a unicast message based on the unicast message including a re-transmission of the encoded bits of the data packet. The operations of 1515 may be performed in accordance with examples as disclosed herein. In some examples, aspects of the operations of 1515 may be performed by a processing component 930 as described with reference to FIG. 9.

Figure 16:
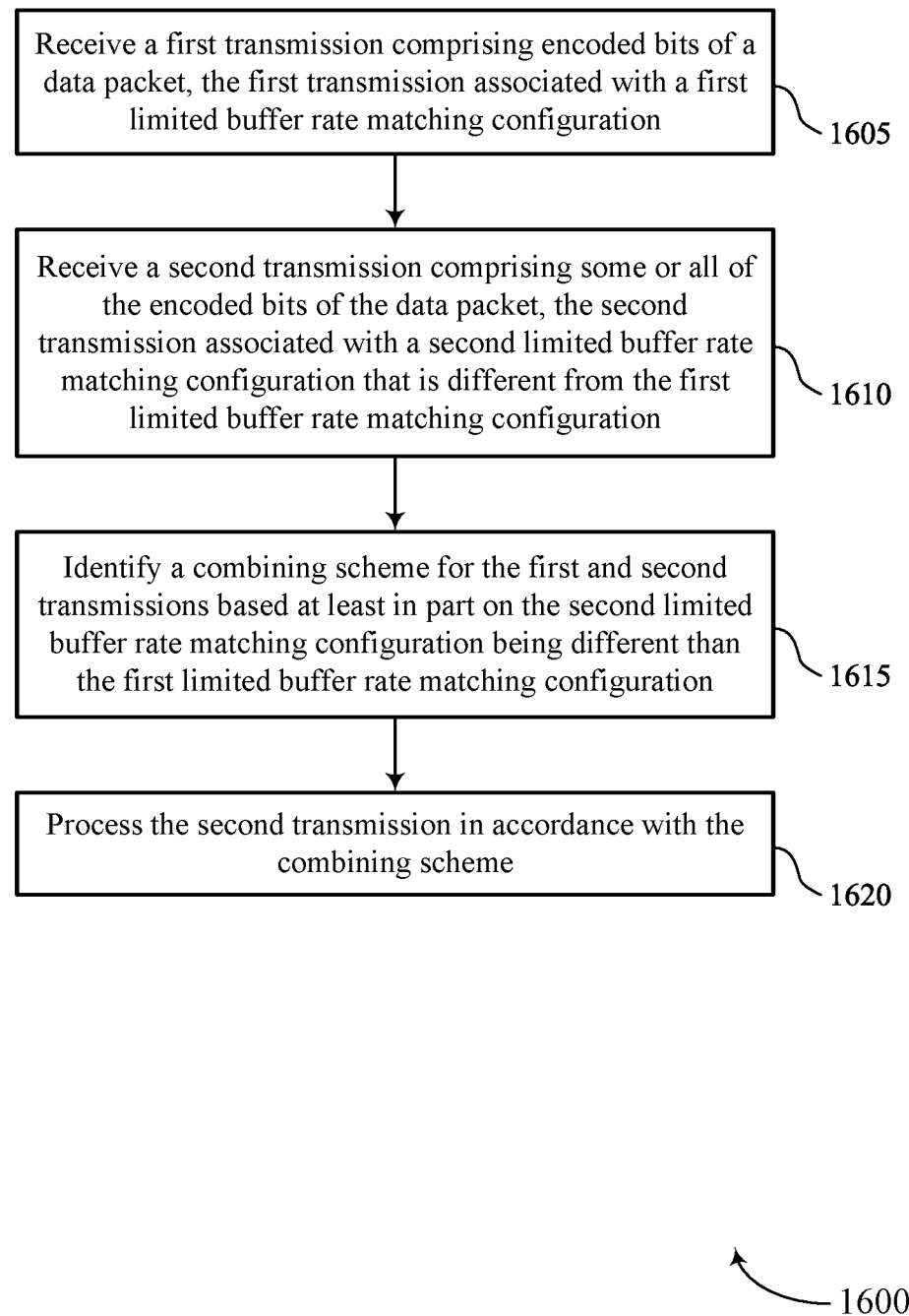

FIG. 16 shows a flowchart illustrating a method 1600 that supports combining with variable limited buffer rate matching in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a first transmission including encoded bits of a data packet, the first transmission associated with a first limited buffer rate matching configuration. The operations of 1605 may be performed in accordance with examples as disclosed herein. In some examples, aspects of the operations of 1605 may be performed by a reception component 935 as described with reference to FIG. 9.

At 1610, the method may include receiving a second transmission including some or all of the encoded bits of the data packet, the second transmission associated with a second limited buffer rate matching configuration that is different from the first limited buffer rate matching configuration. The operations of 1610 may be performed in accordance with examples as disclosed herein. In some examples, aspects of the operations of 1610 may be performed by a reception component 935 as described with reference to FIG. 9.

At 1615, the method may include identifying a combining scheme for the first and second transmissions based on the second limited buffer rate matching configuration being different than the first limited buffer rate matching configuration. The operations of 1615 may be performed in accordance with examples as disclosed herein. In some examples, aspects of the operations of 1615 may be performed by a combination component 940 as described with reference to FIG. 9.

At 1620, the method may include processing the second transmission in accordance with the combining scheme. The operations of 1620 may be performed in accordance with examples as disclosed herein. In some examples, aspects of the operations of 1620 may be performed by a processing component 930 as described with reference to FIG. 9.

Figure 17:
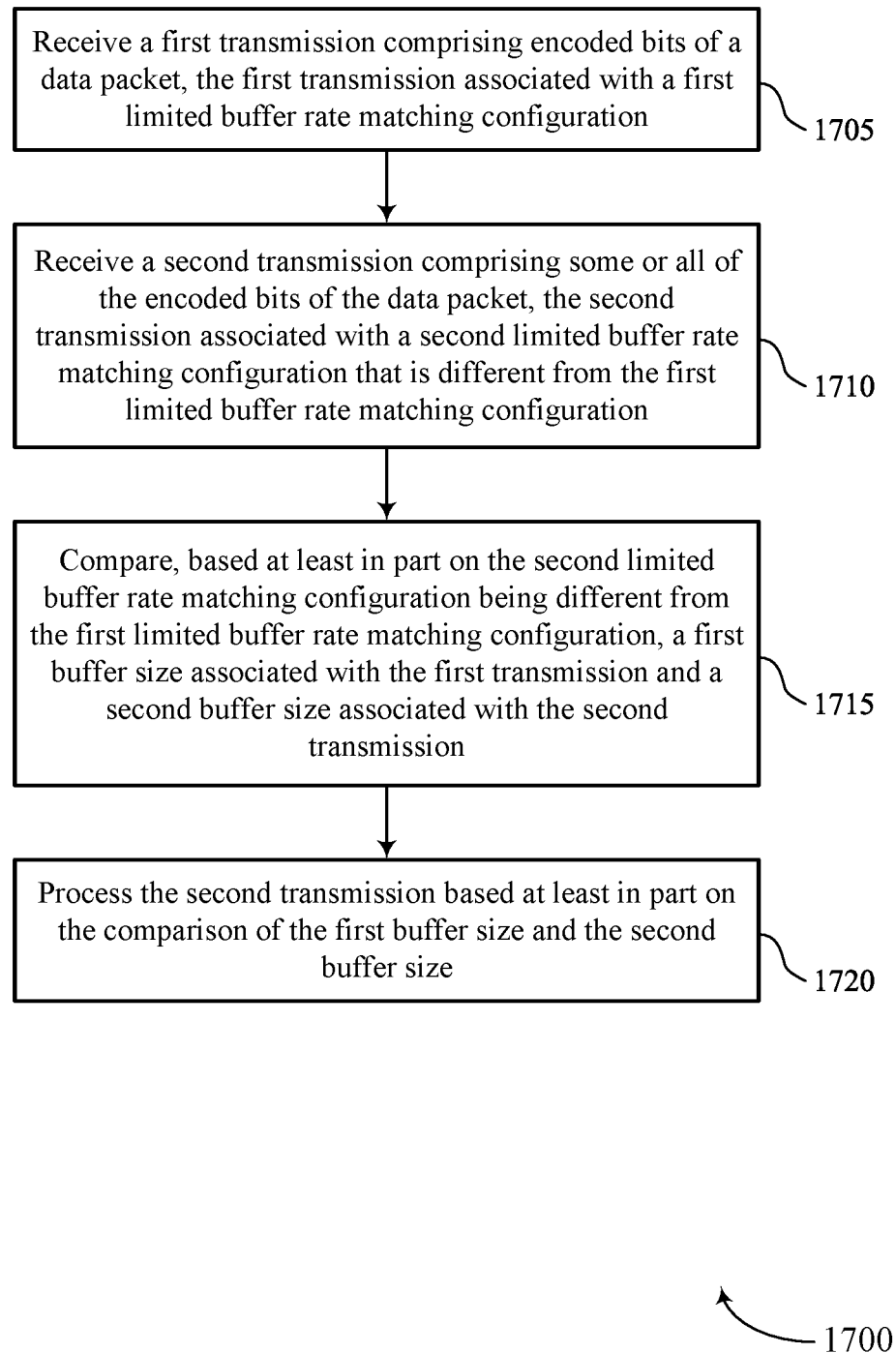

FIG. 17 shows a flowchart illustrating a method 1700 that supports combining with variable limited buffer rate matching in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving a first transmission including encoded bits of a data packet, the first transmission associated with a first limited buffer rate matching configuration. The operations of 1705 may be performed in accordance with examples as disclosed herein. In some examples, aspects of the operations of 1705 may be performed by a reception component 935 as described with reference to FIG. 9.

At 1710, the method may include receiving a second transmission including some or all of the encoded bits of the data packet, the second transmission associated with a second limited buffer rate matching configuration that is different from the first limited buffer rate matching configuration. The operations of 1710 may be performed in accordance with examples as disclosed herein. In some examples, aspects of the operations of 1710 may be performed by a reception component 935 as described with reference to FIG. 9.

At 1715, the method may include comparing, based on the second limited buffer rate matching configuration being different from the first limited buffer rate matching configuration, a first buffer size associated with the first transmission and a second buffer size associated with the second transmission. The operations of 1715 may be performed in accordance with examples as disclosed herein. In some examples, aspects of the operations of 1715 may be performed by a buffer component 945 as described with reference to FIG. 9.

At 1720, the method may include processing the second transmission based on the comparison of the first buffer size and the second buffer size. The operations of 1720 may be performed in accordance with examples as disclosed herein. In some examples, aspects of the operations of 1720 may be performed by a processing component 930 as described with reference to FIG. 9.

Figure 18:
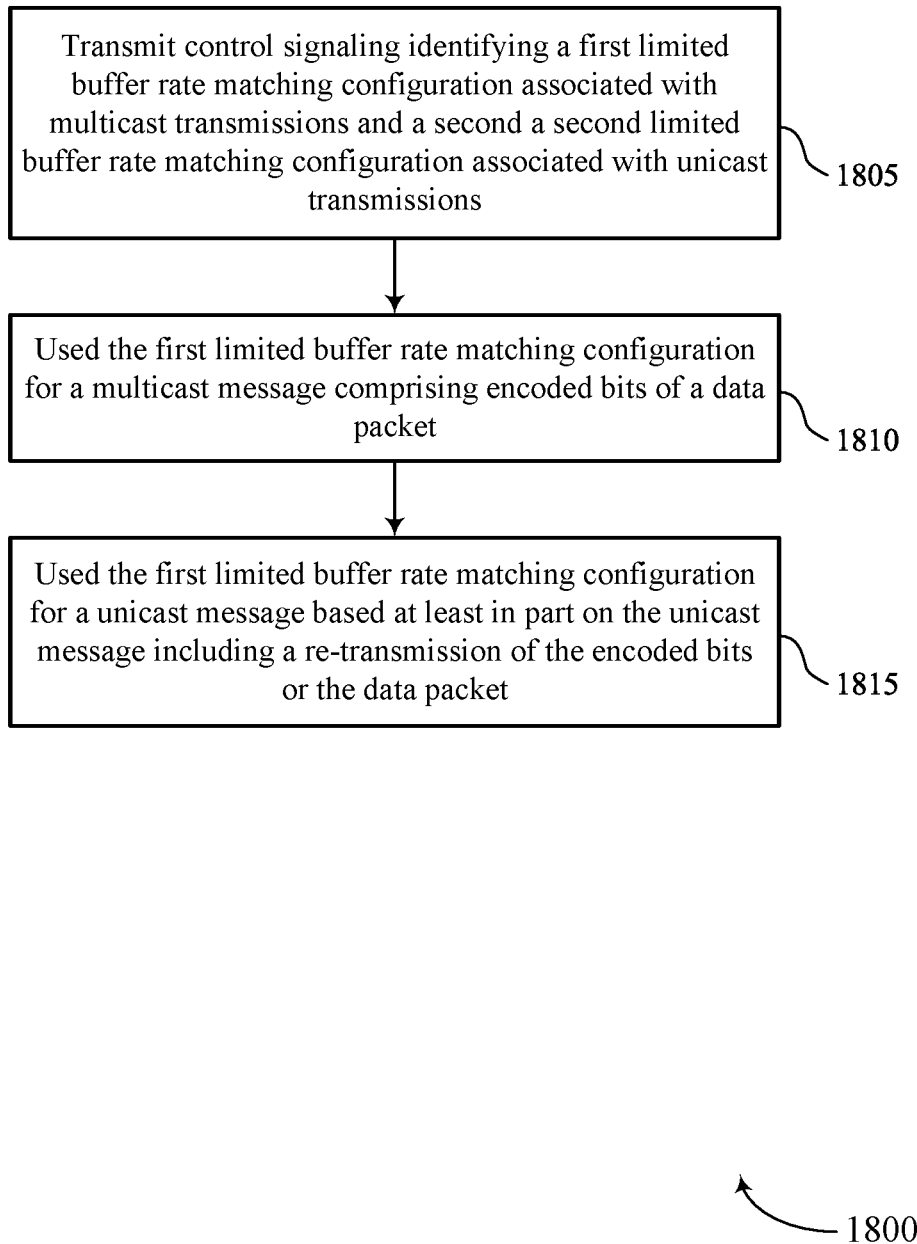

FIG. 18 shows a flowchart illustrating a method 1800 that supports combining with variable limited buffer rate matching in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting control signaling identifying a first limited buffer rate matching configuration associated with multicast transmissions and a second a second limited buffer rate matching configuration associated with unicast transmissions. The operations of 1805 may be performed in accordance with examples as disclosed herein. In some examples, aspects of the operations of 1805 may be performed by a transmission component 1325 as described with reference to FIG. 13.

At 1810, the method may include using the first limited buffer rate matching configuration for a multicast message including encoded bits of a data packet. The operations of 1810 may be performed in accordance with examples as disclosed herein. In some examples, aspects of the operations of 1810 may be performed by a multicast component 1330 as described with reference to FIG. 13.

At 1815, the method may include using the first limited buffer rate matching configuration for a unicast message based on the unicast message including a re-transmission of the encoded bits or the data packet. The operations of 1815 may be performed in accordance with examples as disclosed herein. In some examples, aspects of the operations of 1815 may be performed by a unicast component 1335 as described with reference to FIG. 13.

Aspect 1: A method for wireless communication at a UE, comprising: receiving control signaling identifying a first limited buffer rate matching configuration associated with multicast transmissions and a second limited buffer rate matching configuration associated with unicast transmissions; processing, using the first limited buffer rate matching configuration, a multicast message comprising encoded bits of a data packet; and processing, using the first limited buffer rate matching configuration, a unicast message based at least in part on the unicast message comprising a re-transmission of the encoded bits of the data packet.

Aspect 2: The method of aspect 1, further comprising: receiving, for the multicast message, first downlink control information that indicates a group identifier for the multicast message, wherein the multicast message is processed using the first limited buffer rate matching configuration based at least in part on the group identifier being associated with the first limited buffer rate matching configuration; and receiving, for the unicast message, second downlink control information that indicates a cell identifier for the unicast message, wherein the multicast message is processed using the first limited buffer rate matching configuration based at least in part on the cell identifier being associated with the group identifier.

Aspect 3: The method of any of aspects 1 through 2, wherein the multicast message is associated with a group identifier and the unicast message is associated with a cell identifier, the method further comprising: receiving, for the unicast message, downlink control information that indicates the unicast message is associated with the group identifier, wherein the unicast message is processed using the first limited buffer rate matching configuration based at least in part on the downlink control information indicating that the unicast message is associated with the group identifier.

Aspect 4: The method of any of aspects 1 through 3, wherein the first limited buffer rate matching configuration indicates a threshold quantity of encoded bits permitted to be input into a circular buffer at a base station.

Aspect 5: A method for wireless communication at a UE, comprising: receiving a first transmission comprising encoded bits of a data packet, the first transmission associated with a first limited buffer rate matching configuration; receiving a second transmission comprising some or all of the encoded bits of the data packet, the second transmission associated with a second limited buffer rate matching configuration that is different from the first limited buffer rate matching configuration; identifying a combining scheme for the first and second transmissions based at least in part on the second limited buffer rate matching configuration being different than the first limited buffer rate matching configuration; and processing the second transmission in accordance with the combining scheme.

Aspect 6: The method of aspect 5, wherein the first transmission comprises a multicast transmission and the second transmission comprises a unicast transmission.

Aspect 7: The method of any of aspects 5 through 6, wherein the first transmission comprises a unicast transmission and the second transmission comprises a multicast transmission.

Aspect 8: The method of any of aspects 5 through 7, further comprising: determining a first set of log-likelihood ratios (LLRs) based at least in part on the first transmission, the first set of LLRs comprising a first quantity of LLRs; and determining a second set of LLRs based at least in part on the second transmission, the second set of LLRs comprising a second quantity of LLRs different than the first quantity.

Aspect 9: The method of aspect 8, wherein the first set of LLRs is determined based at least in part on the first limited buffer rate matching configuration and the second set of LLRs is determined based at least in part on the second limited buffer rate matching configuration.

Aspect 10: The method of any of aspects 8 through 9, wherein processing the second transmission comprises: combining the first set of LLRs with the second set of LLRs to generate a combined set of LLRs, the combining based at least in part on a difference between the first quantity and the second quantity; and attempting to decode the combined set of LLRs based at least in part on a size difference between the first quantity and the second quantity.

Aspect 11: The method of aspect 10, further comprising: storing the combined set of LLRs in memory based at least in part on a failure of the attempt to decode the combined set of LLRs, the combined set of LLRs based at least in part on a size difference between the first quantity and the second quantity.

Aspect 12: The method of aspect 8, and wherein processing the second transmission comprises: combining the first set of LLRs with a subset of the second set of LLRs to generate a combined set of LLRs, the subset of the second set of LLRs comprising the first quantity; and attempting to decode the combined set of LLRs, the combined set of LLRs comprising the first quantity.

Aspect 13: The method of aspect 12, further comprising: storing the combined set of LLRs in memory based at least in part on a failure of the attempt to decode the combined set of LLRs.

Aspect 14: The method of 8, wherein processing the second transmission comprises: attempting to decode the second set of LLRs independent of the first set of LLRs.

Aspect 15: The method of aspect 14, further comprising: storing the second set of LLRs in memory, and discarding the first set of LLRs, based at least in part on a failure of the attempt to decode the second set of LLRs.

Aspect 16: The method of aspect 8, wherein the first set of LLRs is associated with a first set of encoded bits that includes the encoded bits and the second set of LLRs is associated with a second set of encoded bits that includes the encoded bits, the method further comprising: determining whether the second set of encoded bits corresponds to encoded bits in the first set of encoded bits that were consecutively stored in a circular buffer at a base station, wherein the combining scheme is identified based at least in part on the determination.

Aspect 17: The method of aspect 16, further comprising: combining a subset of the second set of LLRs with the first set of LLRs to generate a combined set of LLRs, the combining based at least in part on the second set of encoded bits corresponding to encoded bits in the first set of encoded bits that were nonconsecutively stored in the circular buffer; and attempting to decode the combined set of LLRs.

Aspect 18: The method of any of aspects 5 through 17, further comprising: receiving an indication that the first limited buffer rate matching configuration is associated with transmissions of a first type, wherein the first transmission is of the first type; and receiving an indication that the second limited buffer rate matching configuration is associated with transmissions of a second type, wherein the second transmission is of the second type.

Aspect 19: The method of any of aspects 5 through 18, further comprising: indicating a capability of the UE to combine transmissions associated with different limited buffer rate matching configurations, wherein the combining scheme is based at least in part on the capability of the UE.

Aspect 20: The method of any of aspects 5 through 19, further comprising: indicating a capability of the UE to support different limited buffer rate matching configurations for different transmission types, wherein the combining scheme is based at least in part on the capability of the UE.

Aspect 21: The method of any of aspects 5 through 20, further comprising: indicating, to a base station, a quantity of limited buffer rate matching configurations the UE is capable of supporting for a component carrier.

Aspect 22: A method for wireless communication at a UE, comprising: receiving a first transmission comprising encoded bits of a data packet, the first transmission associated with a first limited buffer rate matching configuration; receiving a second transmission comprising some or all of the encoded bits of the data packet, the second transmission associated with a second limited buffer rate matching configuration that is different from the first limited buffer rate matching configuration; comparing, based at least in part on the second limited buffer rate matching configuration being different from the first limited buffer rate matching configuration, a first buffer size associated with the first transmission and a second buffer size associated with the second transmission; and processing the second transmission based at least in part on the comparison of the first buffer size and the second buffer size.

Aspect 23: The method of aspect 22, further comprising: determining, based at least in part on the comparison, that the second buffer size is different than the first buffer size, wherein processing the second transmission comprises identifying the second transmission as an error.

Aspect 24: The method of any of aspects 22 through 23, further comprising: determining, based at least in part on the comparison, that the second buffer size is equal to the first buffer size, wherein processing the second transmission comprises combining the second transmission with the first transmission based at least in part on the determination.

Aspect 25: The method of aspect 22, further comprising: determining, based at least in part on the comparison, that the second buffer size is smaller than the first buffer size, wherein processing the second transmission comprises identifying the second transmission as an error.

Aspect 26: The method of any of aspects 22 and 25, further comprising: determining, based at least in part on the comparison, that the second buffer size is larger than the first buffer size, wherein processing the second transmission comprises combining the second transmission with the first transmission based at least in part on the determination.

Aspect 27: The method of any of aspects 22 through 26, further comprising: determining the first buffer size based at least in part on a first quantity of encoded bits associated with a transport block size for the first transmission and a second quantity of encoded bits associated with a circular buffer at a base station; and determining the second buffer size based at least in part on a third quantity of encoded bits associated with a transport block size for the second transmission and a fourth quantity of encoded bits associated with the circular buffer at the base station.

Aspect 28: A method for wireless communication at a base station, comprising: transmitting control signaling identifying a first limited buffer rate matching configuration associated with multicast transmissions and a second a second limited buffer rate matching configuration associated with unicast transmissions; using the first limited buffer rate matching configuration for a multicast message comprising encoded bits of a data packet; and using the first limited buffer rate matching configuration for a unicast message based at least in part on the unicast message including a re-transmission of the encoded bits or the data packet.

Aspect 29: The method of aspect 28, further comprising: transmitting, for the multicast message, first downlink control information that indicates a group identifier for the multicast message, the group identifier associated with the first limited buffer rate matching configuration; and transmitting, for the unicast message, second downlink control information that indicates a cell identifier for the unicast message, wherein the multicast message is processed using the first limited buffer rate matching configuration based at least in part on the cell identifier being associated with the group identifier.

Aspect 30: The method of any of aspects 28 through 29, wherein the multicast message is associated with a group identifier and the unicast message is associated with a cell identifier, the method further comprising: transmitting, for the unicast message, downlink control information that indicates the unicast message is associated with the group identifier.

Aspect 31: An apparatus for wireless communication at a UE, comprising a processor; memory coupled with the processor; and instructions stored in the memory and executable by the processor to cause the apparatus to perform a method of any of aspects 1 through 4.

Aspect 32: An apparatus for wireless communication at a UE, comprising at least one means for performing a method of any of aspects 1 through 4.

Aspect 33: A non-transitory computer-readable medium storing code for wireless communication at a UE, the code comprising instructions executable by a processor to perform a method of any of aspects 1 through 4.

Aspect 34: An apparatus for wireless communication at a UE, comprising a processor; memory coupled with the processor; and instructions stored in the memory and executable by the processor to cause the apparatus to perform a method of any of aspects 5 through 21.

Aspect 35: An apparatus for wireless communication at a UE, comprising at least one means for performing a method of any of aspects 5 through 21.

Aspect 36: A non-transitory computer-readable medium storing code for wireless communication at a UE, the code comprising instructions executable by a processor to perform a method of any of aspects 5 through 21.

Aspect 37: An apparatus for wireless communication at a UE, comprising a processor; memory coupled with the processor; and instructions stored in the memory and executable by the processor to cause the apparatus to perform a method of any of aspects 22 through 27.

Aspect 38: An apparatus for wireless communication at a UE, comprising at least one means for performing a method of any of aspects 22 through 27.

Aspect 39: A non-transitory computer-readable medium storing code for wireless communication at a UE, the code comprising instructions executable by a processor to perform a method of any of aspects 22 through 27.

Aspect 40: An apparatus for wireless communication at a base station, comprising a processor; memory coupled with the processor; and instructions stored in the memory and executable by the processor to cause the apparatus to perform a method of any of aspects 28 through 30.

Aspect 41: An apparatus for wireless communication at a base station, comprising at least one means for performing a method of any of aspects 28 through 30.

Aspect 42: A non-transitory computer-readable medium storing code for wireless communication at a base station, the code comprising instructions executable by a processor to perform a method of any of aspects 28 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving a first transmission comprising a first set of encoded bits of a data packet, the first transmission being associated with a first limited buffer rate matching configuration;
    receiving a second transmission comprising a second set of the encoded bits of the data packet, the second transmission being associated with a second limited buffer rate matching configuration that is different from the first limited buffer rate matching configuration;

identifying a combining scheme for combining a first set of log-likelihood ratios (LLRs) associated with the first set of encoded bits of the first transmission and a second set of LLRs associated with the second set of encoded bits of the second transmission based at least in part on the second limited buffer rate matching configuration being different than the first limited buffer rate matching configuration; and processing the first set of LLRs and the second set of the LLRs in accordance with the combining scheme.

2. The method of claim 1, wherein the first transmission comprises a multicast transmission and the second transmission comprises a unicast transmission.

3. The method of claim 1, wherein the first transmission comprises a unicast transmission and the second transmission comprises a multicast transmission.

4. The method of claim 1, further comprising:
determining the first set of LLRs based at least in part on the first transmission, the first set of LLRs comprising a first quantity of LLRs; and
determining the second set of LLRs based at least in part on the second transmission, the second set of LLRs comprising a second quantity of LLRs different than the first quantity.

5. The method of claim 4, wherein the first set of LLRs is determined based at least in part on the first limited buffer rate matching configuration and the second set of LLRs is determined based at least in part on the second limited buffer rate matching configuration.

6. The method of claim 4, wherein processing the first set of LLRs and the second set of the LLRs comprises:
combining the first set of LLRs with the second set of LLRs to generate a combined set of LLRs, the combining based at least in part on a difference between the first quantity of LLRs and the second quantity of LLRs; and
attempting to decode the combined set of LLRs based at least in part on a size difference between the first quantity of LLRs and the second quantity of LLRs.

7. The method of claim 6, further comprising:
storing the combined set of LLRs in memory based at least in part on a failure of the attempt to decode the combined set of LLRs, the combined set of LLRs based at least in part on a size difference between the first quantity of LLRs and the second quantity of LLRs.

8. The method of claim 4, and wherein processing the first set of LLRs and the second set of the LLRs comprises:
combining the first set of LLRs with a subset of the second set of LLRs to generate a combined set of LLRs, the subset of the second set of LLRs comprising the first quantity of LLRs; and
attempting to decode the combined set of LLRs, the combined set of LLRs comprising the first quantity of LLRs.

9. The method of claim 8, further comprising:
storing the combined set of LLRs in memory based at least in part on a failure of the attempt to decode the combined set of LLRs.

10. The method of claim 4, wherein processing the first set of LLRs and the second set of the LLRs comprises:
attempting to decode the second set of LLRs independent of the first set of LLRs.

11. The method of claim 10, further comprising:
storing the second set of LLRs in memory, and discarding the first set of LLRs, based at least in part on a failure of the attempt to decode the second set of LLRs.

12. The method of claim 4, wherein the method further comprises:
determining whether the second set of encoded bits corresponds to encoded bits in the first set of encoded bits that were consecutively stored in a circular buffer at a base station, wherein the combining scheme is identified based at least in part on the determination.

13. The method of claim 12, further comprising:
combining a subset of the second set of LLRs with the first set of LLRs to generate a combined set of LLRs, the combining based at least in part on the second set of encoded bits corresponding to encoded bits in the first set of encoded bits that were nonconsecutively stored in the circular buffer; and
attempting to decode the combined set of LLRs.

14. The method of claim 1, further comprising:
receiving an indication that the first limited buffer rate matching configuration is associated with transmissions of a first type, wherein the first transmission is of the first type; and
receiving an indication that the second limited buffer rate matching configuration is associated with transmissions of a second type, wherein the second transmission is of the second type.

15. The method of claim 1, further comprising:
indicating a capability of the UE to combine transmissions associated with different limited buffer rate matching configurations, wherein the combining scheme is based at least in part on the capability of the UE.

16. The method of claim 1, further comprising:
indicating a capability of the UE to support different limited buffer rate matching configurations for different transmission types, wherein the combining scheme is based at least in part on the capability of the UE.

17. The method of claim 1, further comprising:
indicating, to a base station, a quantity of limited buffer rate matching configurations the UE is capable of supporting for a component carrier.

18. The method of claim 1, wherein the first set of the encoded bits of the data packet is different than the second set of the encoded bits of the data packet.

19. The method of claim 1, wherein the first set of the encoded bits of the data packet comprises all of the encoded bits of the data packet, and the second set of the encoded bits of the data packet comprises a subset of the encoded bits of the data packet.

20. The method of claim 1, wherein the first set of the encoded bits of the data packet comprises a subset of the encoded bits of the data packet, and the second set of the encoded bits of the data packet comprises all of the encoded bits of the data packet.

21. An apparatus for wireless communication, comprising:
a processor; and
a memory coupled with the processor, with instructions stored in the memory, the instructions executable by the processor to cause the apparatus to:
receive a first transmission comprising a first set of encoded bits of a data packet, the first transmission being associated with a first limited buffer rate matching configuration;

receive a second transmission comprising a second set of the encoded bits of the data packet, the second transmission being associated with a second limited buffer rate matching configuration that is different from the first limited buffer rate matching configuration;

identify a combining scheme for combining a first set of log-likelihood ratios (LLRs) associated with the first set of encoded bits of the first transmission and a second set of LLRs associated with the second set of encoded bits of the second transmission based at least in part on the second limited buffer rate matching configuration being different than the first limited buffer rate matching configuration; and process the first set of LLRs and the second set of LLRs in accordance with the combining scheme.

22. The apparatus of claim 21, wherein the first transmission comprises a multicast transmission and the second transmission comprises a unicast transmission.

23. The apparatus of claim 21, wherein the first transmission comprises a unicast transmission and the second transmission comprises a multicast transmission.

24. The apparatus of claim 21, wherein the instructions are further executable by the processor to cause the apparatus to:
determine the first set of LLRs based at least in part on the first transmission, the first set of LLRs comprising a first quantity of LLRs; and
determine the second set of LLRs based at least in part on the second transmission, the second set of LLRs comprising a second quantity of LLRs different than the first quantity.

25. The apparatus of claim 24, wherein the first set of LLRs is determined based at least in part on the first limited buffer rate matching configuration and the second set of LLRs is determined based at least in part on the second limited buffer rate matching configuration.

26. The apparatus of claim 24, wherein the instructions executable by the processor to cause the apparatus to process the first set of LLRs and the second set of the LLRs are executable to cause the apparatus to:
combine the first set of LLRs with the second set of LLRs to generate a combined set of LLRs, the combining based at least in part on a difference between the first quantity of LLRs and the second quantity of LLRs; and
attempt to decode the combined set of LLRs based at least in part on a size difference between the first quantity of LLRs and the second quantity of LLRs.

27. The apparatus of claim 26, wherein the instructions are further executable by the processor to cause the apparatus to:
store the combined set of LLRs in memory based at least in part on a failure of the attempt to decode the combined set of LLRs, the combined set of LLRs based at least in part on a size difference between the first quantity of LLRs and the second quantity of LLRs.

28. The apparatus of claim 24, wherein the instructions executable by the processor to cause the apparatus to process the first set of LLRs and the second set of the LLRs are executable by the processor to cause the apparatus to:
combine the first set of LLRs with a subset of the second set of LLRs to generate a combined set of LLRs, the subset of the second set of LLRs comprising the first quantity of LLRs; and
attempt to decode the combined set of LLRs, the combined set of LLRs comprising the first quantity of LLRs.

29. The apparatus of claim 28, wherein the instructions are further executable by the processor to cause the apparatus to:
store the combined set of LLRs in memory based at least in part on a failure of the attempt to decode the combined set of LLRs.

30. The apparatus of claim 24, wherein the instructions executable by the processor to cause the apparatus to process the first set of LLRs and the second set of the LLRs are executable by the processor to cause the apparatus to:
attempt to decode the second set of LLRs independent of the first set of LLRs.

31. The apparatus of claim 30, wherein the instructions are further executable by the processor to cause the apparatus to:
store the second set of LLRs in memory, and discard the first set of LLRs, based at least in part on a failure of the attempt to decode the second set of LLRs.

32. The apparatus of claim 21, wherein the first set of the encoded bits of the data packet is different than the second set of the encoded bits of the data packet.

33. The apparatus of claim 21, wherein the first set of the encoded bits of the data packet comprises all of the encoded bits of the data packet, and the second set of the encoded bits of the data packet comprises a subset of the encoded bits of the data packet.

34. The apparatus of claim 21, wherein the first set of the encoded bits of the data packet comprises a subset of the encoded bits of the data packet, and the second set of the encoded bits of the data packet comprises all of the encoded bits of the data packet.

35. An apparatus for wireless communication, comprising:
means for receiving a first transmission comprising a first set of encoded bits of a data packet, the first transmission being associated with a first limited buffer rate matching configuration;
means for receiving a second transmission comprising a second set of the encoded bits of the data packet, the second transmission being associated with a second limited buffer rate matching configuration that is different from the first limited buffer rate matching configuration;
means for identifying a combining scheme for combining a first set of log-likelihood ratios (LLRs) associated with the first set of encoded bits of the first transmission and a second set of LLRs associated with the second set of encoded bits of the second transmission based at least in part on the second limited buffer rate matching configuration being different than the first limited buffer rate matching configuration; and
means for processing the first set of LLRs and the second set of the LLRs in accordance with the combining scheme.

36. A non-transitory computer-readable medium storing code for wireless communication, the code comprising instructions executable by a processor to:
receive a first transmission comprising a first set of encoded bits of a data packet, the first transmission being associated with a first limited buffer rate matching configuration;
receive a second transmission comprising a second set of the encoded bits of the data packet, the second transmission being associated with a second limited buffer rate matching configuration that is different from the first limited buffer rate matching configuration;

identify a combining scheme for combining a first set of log-likelihood ratios (LLRs) associated with the first set of encoded bits of the first transmission and a second set of LLRs associated with the second set of encoded bits of the second transmission based at least in part on the second limited buffer rate matching configuration being different than the first limited buffer rate matching configuration; and process the first set of LLRs and the second set of the LLRs in accordance with the combining scheme.

* * * * *